US012628086B2

(12) United States Patent
Määttänen et al.

(10) Patent No.: US 12,628,086 B2
(45) Date of Patent: May 12, 2026

(54) MAC CE FOR POWER CONTROL FOR UPLINK TRANSMISSIONS TOWARDS MULTIPLE TRPs

(71) Applicant: Telefonaktiebolaget LM Ericsson (publ), Stockholm (SE)

(72) Inventors: Helka-Liina Määttänen, Helsinki (FI); Shiwei Gao, Nepean (CA); Siva Muruganathan, Stittsville (CA); Andreas Nilsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 514 days.

(21) Appl. No.: 18/019,493

(22) PCT Filed: Aug. 4, 2021

(86) PCT No.: PCT/IB2021/057168
§ 371 (c)(1),
(2) Date: Feb. 3, 2023

(87) PCT Pub. No.: WO2022/029658
PCT Pub. Date: Feb. 10, 2022

(65) Prior Publication Data
US 2023/0292250 A1     Sep. 14, 2023

Related U.S. Application Data

(60) Provisional application No. 63/061,710, filed on Aug. 5, 2020.

(51) Int. Cl.
*H04W 52/14*        (2009.01)
*H04W 52/08*        (2009.01)
*H04W 52/24*        (2009.01)

(52) U.S. Cl.
CPC ......... *H04W 52/146* (2013.01); *H04W 52/08* (2013.01); *H04W 52/242* (2013.01)

(58) Field of Classification Search
CPC . H04W 52/146; H04W 52/08; H04W 52/242; H04W 52/228; H04W 52/226
See application file for complete search history.

(56) References Cited

U.S. PATENT DOCUMENTS

2016/0374026 A1    12/2016    Dinan
2018/0368017 A1    12/2018    Sundararajan et al.
(Continued)

FOREIGN PATENT DOCUMENTS

CN        110536399 A      12/2019
EP          3481113 A1      5/2019
(Continued)

OTHER PUBLICATIONS

Zte et al: "Summary for AI 7.1.6.1 NR UL power control in non-CA aspects", 3GPP Draft; R1-1803282. vol. RAN WG1, No. Athens, Greece; Feb. 27, 2018, XP051398455. (Year: 2018).*
(Continued)

*Primary Examiner* — John J Lee
(74) *Attorney, Agent, or Firm* — Sonoda & Kobayashi Intellectual Property Law; Sarvajit S. Patil

(57)        ABSTRACT

Systems and methods for activating or updating power control parameters are provided. In some embodiments, a method performed by a wireless communication device comprises a method performed by a wireless communication device comprises receiving an indication of activated Transmission Configuration Indicator (TCI) states for physical uplink channels or uplink reference signals via a first Medium Access Control (MAC) Control Element (CE) message; receiving one or more power control parameter lists each comprising a plurality of elements; obtaining
(Continued)

power control state information via a second MAC CE message that maps a power control state. The power control state information comprises indications each indicating a particular element from among the plurality of elements in one of the one or more power control parameter lists; and transmitting each of the physical uplink channels or uplink reference signals according to the active TCI states and the respective power control state information.

19 Claims, 24 Drawing Sheets

(56) References Cited

U.S. PATENT DOCUMENTS

| | | | |
|---|---|---|---|
| 2019/0253986 A1 | 8/2019 | Jeon et al. | |
| 2019/0261280 A1* | 8/2019 | Jung | H04W 52/386 |
| 2019/0335400 A1 | 10/2019 | Gong et al. | |
| 2020/0059867 A1 | 2/2020 | Haghighat et al. | |
| 2020/0100193 A1 | 3/2020 | Cheng et al. | |
| 2020/0259625 A1 | 8/2020 | Papasakellariou | |
| 2021/0219246 A1 | 7/2021 | Xu et al. | |
| 2022/0046661 A1* | 2/2022 | Jeon | H04W 76/30 |
| 2023/0262754 A1* | 8/2023 | He | H04L 5/0091 |
| | | | 370/329 |

FOREIGN PATENT DOCUMENTS

| | | | |
|---|---|---|---|
| EP | 3731448 A1 | 10/2020 | |
| WO | 2010051514 A1 | 5/2010 | |
| WO | 2019070178 A1 | 4/2019 | |
| WO | 2019097478 A1 | 5/2019 | |
| WO | 2019134100 A1 | 7/2019 | |
| WO | 2020034442 A1 | 2/2020 | |
| WO | 2020044409 A1 | 3/2020 | |
| WO | 2020063923 A1 | 4/2020 | |
| WO | 2020093361 A1 | 5/2020 | |
| WO | 2021260658 A1 | 12/2021 | |
| WO | 2022029691 A1 | 2/2022 | |

OTHER PUBLICATIONS

Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Ericsson, "R1-1718655: Further details on closed loop power control," 3GPP TSG RAN WG1 Meeting 90bis, Oct. 9-13, 2017, Prague, Czech Republic, 4 pages.
Qualcomm Incorporated, "R2-2005185: Remaining issues on DL MIMO MAC CE," 3GPP TSG-RAN WG2 Meeting #110e, Jun. 1-12, 2020, Electronic Meeting, 6 pages.
Vivo, " R1-1910229: Discussion on remaining issues on multi TRP transmissoin," 3GPP TSG RAN WG1 #98bis, Oct. 14-20, 2019, Chongqing, China, 15 pages.
Zte, et al., "R1-1803282: Summary for AI 7.1.6.1 NR UL power control in non-CA aspects," 3GPP TSG RAN WG1 Meeting #92, Feb. 26-Mar. 2, 2018, Athens, Greece, 28 pages.
International Search Report and Written Opinion for International Patent Application No. PCT/IB2021/055717, mailed Sep. 24, 2021, 15 pages.

International Search Report and Written Opinion for International Patent Application No. PCT/IB2021/057220, mailed Nov. 17, 2021, 19 pages.
International Search Report and Written Opinion for International Patent Application No. PCT/IB2021/057168, mailed Nov. 9, 2021, 20 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Notice of Reasons for Refusal for Japanese Patent Application No. 2022-579089, mailed Dec. 25, 2023, 14 pages.
Author Unknown, "Technical Specification Group Radio Access Network; NR; User Equipment (UE) radio transmission and reception; Part 1: Range 1 Standalone (Release 17)," Technical Specification 38.101-1, Version 17.1.0, Mar. 2021, 3GPP Organizational Partners, 513 pages.
Author Unknown, "Technical Specification Group Radio Access Network; NR; User Equipment (UE) radio transmission and reception; Part 2: Range 2 Standalone (Release 17)," Technical Specification 38.101-2, Version 17.1.0, Mar. 2021, 3GPP Organizational Partners, 189 pages.
Author Unknown, "Technical Specification Group Radio Access Network; NR; User Equipment (UE) radio transmission and reception; Part 3: Range 1 and Range 2 Interworking operatoin with other radios (Release 17)," Technical Specification 38.101-3, Version 17.1.0, Mar. 2021, 3GPP Organizational Partners, 716 pages.
Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.
Author Unknown, "Technical Specification Group Radio Access Network; NR; Physical layer procedures for control (Release 16)," Technical Specification 38.213, Version 16.5.0, Mar. 2021, 3GPP Organizational Partners, 183 pages.
Author Unknown, "Technical Specification Group Radio Access Network; NR; Medium Access Control (MAC) protocol specification (Release 16)," Technical Specification 38.321, Version 16.4.0, Mar. 2021, 3GPP Organizational Partners, 183 pages.
Author Unknown, "Technical Specification Group Radio Access Network; NR; Radio Resource Control (RRC) protocol specification (Release 16)," Technical Specification 38.331, Version 16.4.0, Mar. 2021, 3GPP Organizational Partners, 949 pages.
Author Unknown, "Technical Specification Group Radio Access Network; NR; Radio Resource Control (RRC) protocol specification (Release 16)," Technical Specification 38.331, Version 16.4.1, Mar. 2021, 3GPP Organizational Partners, 949 pages.
Ericsson, "R1-2103550: On PDCCH, PUCCH and PUSCH enhancements for multi-TRP," 3GPP TSG-RAN WG1 Meeting #104bis-e, Apr. 12-20, 2021, Electronic Meeting, 29 pages.
Nokia, et al., "R1-2103844: Summary #2 of Multi-TRP PUCCH and PUSCH," 3GPP TSG RAN WG1 #104bis-e, Apr. 12-20, 2021, Electronic Meeting, 129 pages.
Samsung, "R1-2103222: Enhancements on Multi-TRP for PDCCH, PUCCH and PUSCH," 3GPP TSG RAN WG1 #104b-e, Apr. 12-20, 2021, Electronic Meeting, 15 pages.
Zte, "R1-2102661: Multi-TRP Enhancements for PDCCH, PUCCH, and PUSCH," 3GPP TSG RAN WG1 Meeting #104b-e, Apr. 12-20, 2021, Electronic Meeting, 27 pages.
International Search Report and Written Opinion for International Patent Application No. PCT/IB2022/054403, mailed Aug. 18, 2022, 17 pages.
Written Opinion for International Patent Application No. PCT/IB2022/054403, mailed Mar. 23, 2023, 7 pages.
International Preliminary Report on Patentability for International Patent Application No. PCT/IB2022/054403, mailed Jul. 25, 2023, 25 pages.
Author Unknown, "Technical Specification Group Radio Access Network; NR; Requirements for support of radio resource management (Release 17)," Technical Specification 38.133, Version 17.1.0, Mar. 2021, 2,172 pages.

* cited by examiner

PUCCH-SPATIALRELATIONINFO INFORMATION ELEMENT

```
-- ASN1START
-- TAG-PUCCH-SPATIALRELATIONINFO-START

PUCCH-SpatialRelationInfo ::=           SEQUENCE {
    pucch-SpatialRelationInfoId             PUCCH-SpatialRelationInfoId,
    servingCellId                           ServCellIndex                       OPTIONAL,   -- Need S
    referenceSignal                         CHOICE {
        ssb-Index                               SSB-Index,
        csi-RS-Index                            NZP-CSI-RS-ResourceId,
        srs                                     PUCCH-SRS
    },
    pucch-PathlossReferenceRS-Id            PUCCH-PathlossReferenceRS-Id,
    p0-PUCCH-Id                             P0-PUCCH-Id,
    closedLoopIndex                         ENUMERATED { i0, i1 }
}

PUCCH-SpatialRelationInfo-r16 ::=       SEQUENCE {
    pucch-SpatialRelationInfoId-r16         PUCCH-SpatialRelationInfoId-r16,
    servingCellId-r16                       ServCellIndex                       OPTIONAL,   -- Need S
    referenceSignal-r16                     CHOICE {
        ssb-Index                               SSB-Index,
        csi-RS-Index                            NZP-CSI-RS-ResourceId,
        srs                                     PUCCH-SRS
    },
    pucch-PathlossReferenceRS-Id-r16        PUCCH-PathlossReferenceRS-ID-r16,
    p0-PUCCH-Id-r16                         P0-PUCCH-Id,
    closedLoopIndex-r16                     ENUMERATED { i0, i1 }
}

PUCCH-SRS ::=       SEQUENCE {
    resource                SRS-ResourceId,
    uplinkBWP               BWP-Id
}

-- TAG-PUCCH-SPATIALRELATIONINFO-STOP
-- ASN1STOP
```

*FIG. 4*

```
SRS-SpatialRelationInfo ::=    SEQUENCE {
    servingCellID                  ServCellIndex                OPTIONAL,    -- Need S
    referenceSignal                CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }
}
```

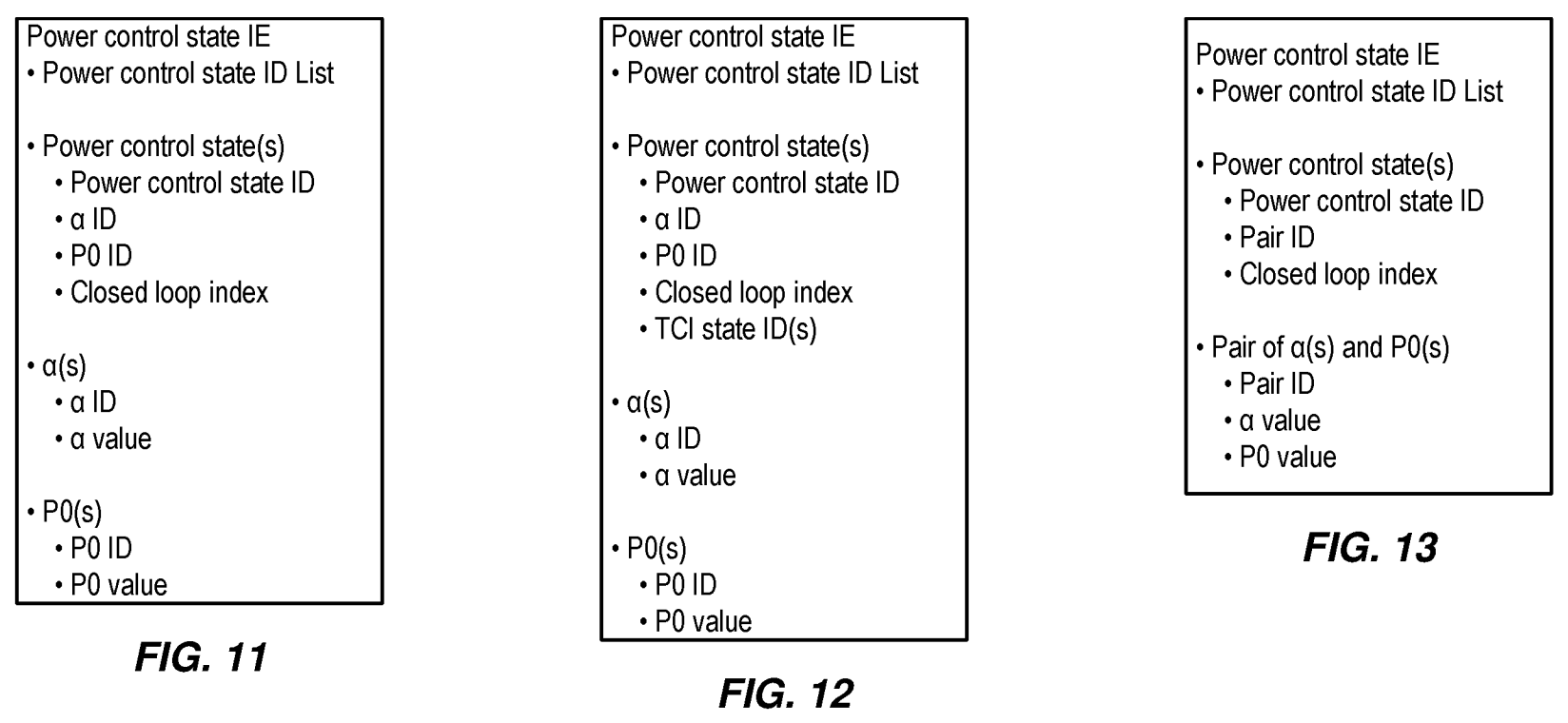

Power control state IE
• Power control state ID List

• Power control state(s)
 • Power control state ID
 • Pair ID
 • Closed loop index

• Pair of α(s) and P0(s)
 • Pair ID
 • α value
 • P0 value

*FIG. 13*

Power control state IE
• Power control state ID List

• Power control state(s)
 • Power control state ID
 • α ID
 • P0 ID
 • Closed loop index
 • TCI state ID(s)

• α(s)
 • α ID
 • α value

• P0(s)
 • P0 ID
 • P0 value

*FIG. 12*

Power control state IE
• Power control state ID List

• Power control state(s)
 • Power control state ID
 • α ID
 • P0 ID
 • Closed loop index

• α(s)
 • α ID
 • α value

• P0(s)
 • P0 ID
 • P0 value

*FIG. 11*

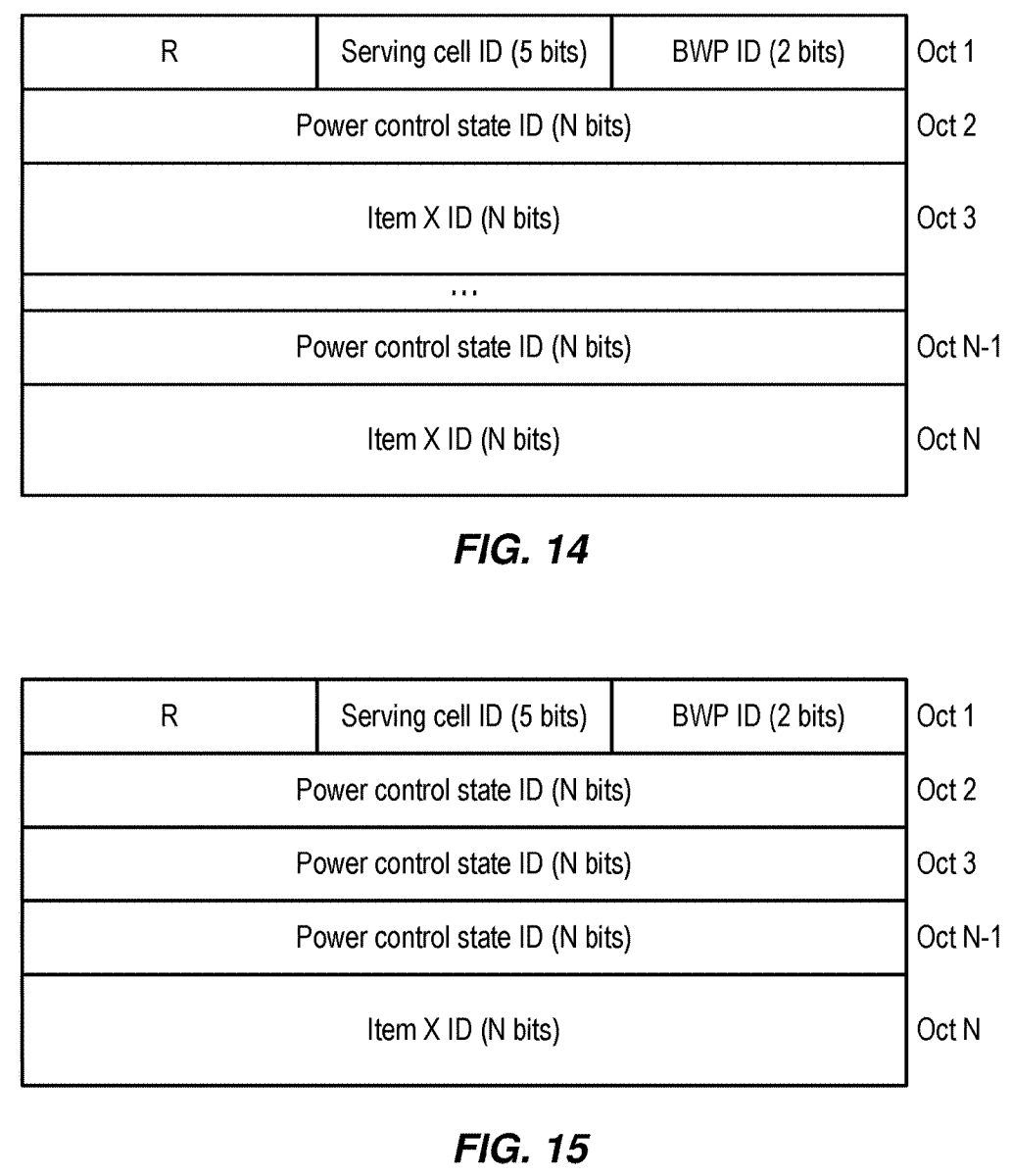

| R | Serving cell ID (5 bits) | BWP ID (2 bits) | Oct 1 |
|---|---|---|---|
| Power control state ID (N bits) | | | Oct 2 |
| Item X ID (N bits) | | | Oct 3 |
| ... | | | |
| Power control state ID (N bits) | | | Oct N-1 |
| Item X ID (N bits) | | | Oct N |

FIG. 14

| R | Serving cell ID (5 bits) | BWP ID (2 bits) | Oct 1 |
|---|---|---|---|
| Power control state ID (N bits) | | | Oct 2 |
| Power control state ID (N bits) | | | Oct 3 |
| Power control state ID (N bits) | | | Oct N-1 |
| Item X ID (N bits) | | | Oct N |

FIG. 15

| R | Oct 1 | Serving cell ID | BWP ID |
|---|---|---|---|
| $C_0$ | Oct 2 | TCI state $ID_{0,1}$ | |
| R | Oct 3 (optional) | TCI state $ID_{0,2}$ | |
| $\cdots$ | | | |
| $C_N$ | Oct M-1 | TCI state $ID_{N,1}$ | |
| R | Oct M (optional) | TCI state $ID_{N,2}$ | |

| R | Oct 1 | Serving cell ID (5 bits) | BWP ID (2 bits) |
|---|---|---|---|
| R | Oct 2 | N | "TCI state to power control" ID (x bits) |
| R | Oct 3 | F | $P_0$ and $\alpha$ set ID (y bits) |
| R | Oct 4 | F | Pathloss RS ID (z bits) |
| R | Oct 5 | F | Closed-loop index (k bits) |

| | Serving cell ID (5 bits) | BWP ID (2 bits) | |
|---|---|---|---|
| R | | | Oct 1 |
| R | N | "TCI state to power control" ID_i (x bits) | Oct 2 |
| R | F | $P_0$ and α set ID (y bits) | Oct 3 |
| R | F | Pathloss RS ID (z bits) | Oct 4 |
| C | F | Closed-loop index (k bits) | Oct 5 |
| R | N | "TCI state to power control" ID_j (x bits) | Oct 6 |
| R | F | $P_0$ and α set ID (y bits) | Oct 7 |
| R | F | Pathloss RS ID (z bits) | Oct 8 |
| C | F | Closed-loop index (k bits) | Oct 9 |

*FIG. 18*

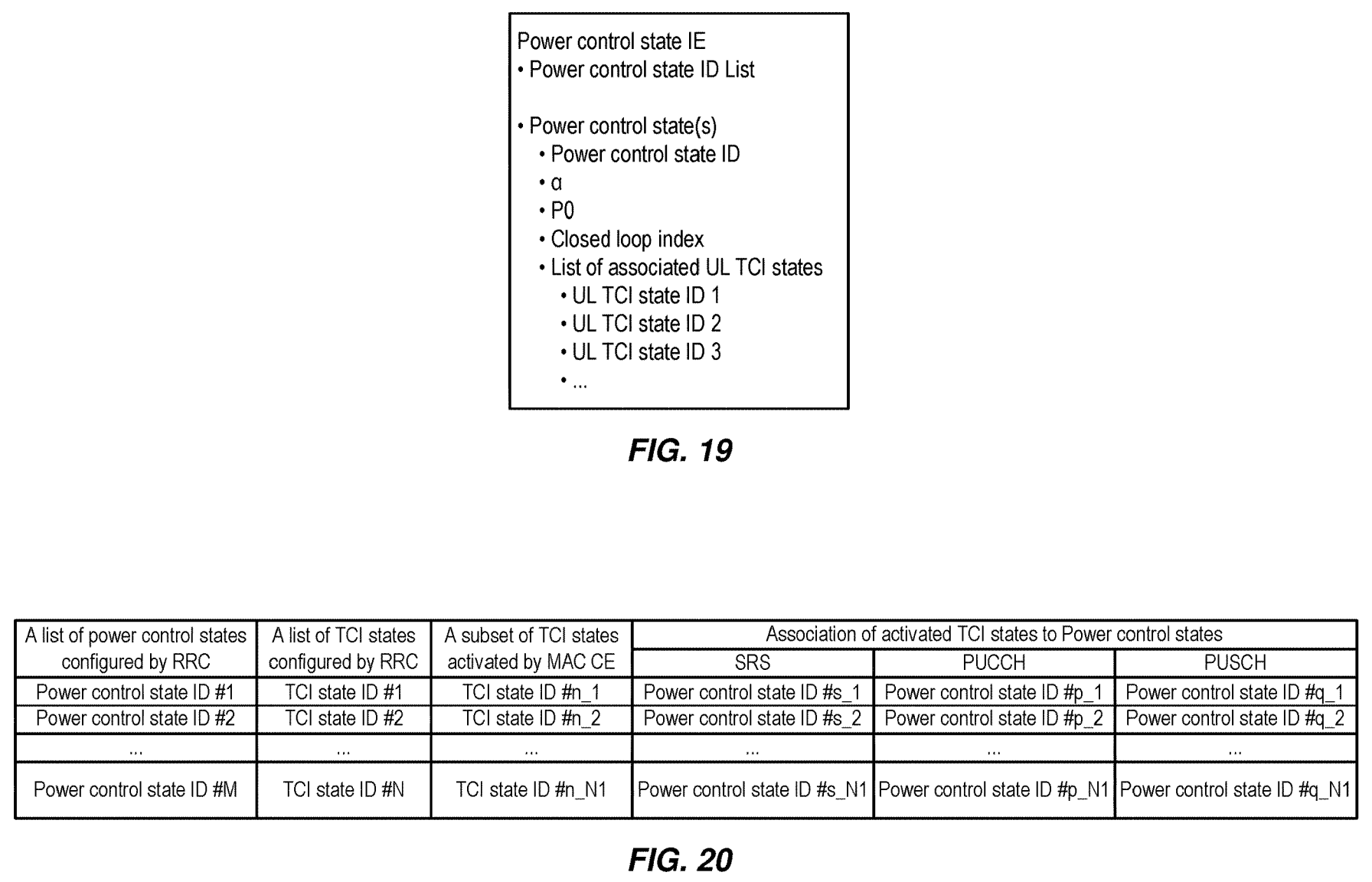

Power control state IE
• Power control state ID List

• Power control state(s)
  • Power control state ID
    • α
    • P0
    • Closed loop index
    • List of associated UL TCI states
      • UL TCI state ID 1
      • UL TCI state ID 2
      • UL TCI state ID 3
      • ...

FIG. 19

| A list of power control states configured by RRC | A list of TCI states configured by RRC | A subset of TCI states activated by MAC CE | Association of activated TCI states to Power control states | | |
|---|---|---|---|---|---|
| | | | SRS | PUCCH | PUSCH |
| Power control state ID #1 | TCI state ID #1 | TCI state ID #n_1 | Power control state ID #s_1 | Power control state ID #p_1 | Power control state ID #q_1 |
| Power control state ID #2 | TCI state ID #2 | TCI state ID #n_2 | Power control state ID #s_2 | Power control state ID #p_2 | Power control state ID #q_2 |
| ... | ... | ... | ... | ... | ... |
| Power control state ID #M | TCI state ID #N | TCI state ID #n_N1 | Power control state ID #s_N1 | Power control state ID #p_N1 | Power control state ID #q_N1 |

FIG. 20

| A subset of TCI states activated by MAC CE | Association of activated TCI states to Power control states | | | Associated SRS resource set |
|---|---|---|---|---|
| | SRS | PUCCH | PUSCH | |
| TCI state ID #n_1 | Power control state ID #s_1 | Power control state ID #p_1 | Power control state ID #q_1 | SRS resource set ID #j_1 |
| TCI state ID #n_2 | Power control state ID #s_2 | Power control state ID #p_2 | Power control state ID #q_2 | SRS resource set ID #j_2 |
| ... | ... | ... | ... | ... |
| TCI state ID #n_N1 | Power control state ID #s_N1 | Power control state ID #p_N1 | Power control state ID #q_N1 | SRS resource set ID #j_N1 |

*FIG. 21*

| A subset of TCI states activated by MAC CE | Association of Activated TCI states and Power control states for different UL channels/UL resource sets | | | | | | |
|---|---|---|---|---|---|---|---|
| | SRS set #1 | SRS set #2 | SRS set #3 | SRS set #4 | SRS set #5 | PUCCH | PUSCH |
| TCI state ID #1 | Power control state ID #1 | Power control state ID #2 | Power control state ID #2 | Power control state ID #2 | Power control state ID #2 | Power control state ID #3 | Power control state ID #4 |
| TCI state ID #2 | Power control state ID #5 | Power control state ID #6 | Power control state ID #6 | Power control state ID #6 | Power control state ID #6 | Power control state ID #7 | Power control state ID #8 |
| TCI state ID #3 | Power control state ID #5 | Power control state ID #6 | Power control state ID #6 | Power control state ID #6 | Power control state ID #6 | Power control state ID #7 | Power control state ID #8 |

*FIG. 22*

| $F_{PL\,RS}$ | Serving cell ID | | BWP ID | |
|---|---|---|---|---|
| $F_{P_0}$ | $F_{CL\,index}$ | $F_{accumulation}$ | "TCI state to power control" ID (x bits) | Oct 1 |
| $F_\alpha$ | | | | Oct 2 |
| R | Pathloss RS ID (z bits) | | | Oct 3 |
| R | $P_0$ set ID (y bits) | | | Oct 4 |
| R | $\alpha$ set ID (y bits) | | | Oct 5 |
| R | Closed-loop index (k bits) | | | Oct 6 |

*FIG. 23*

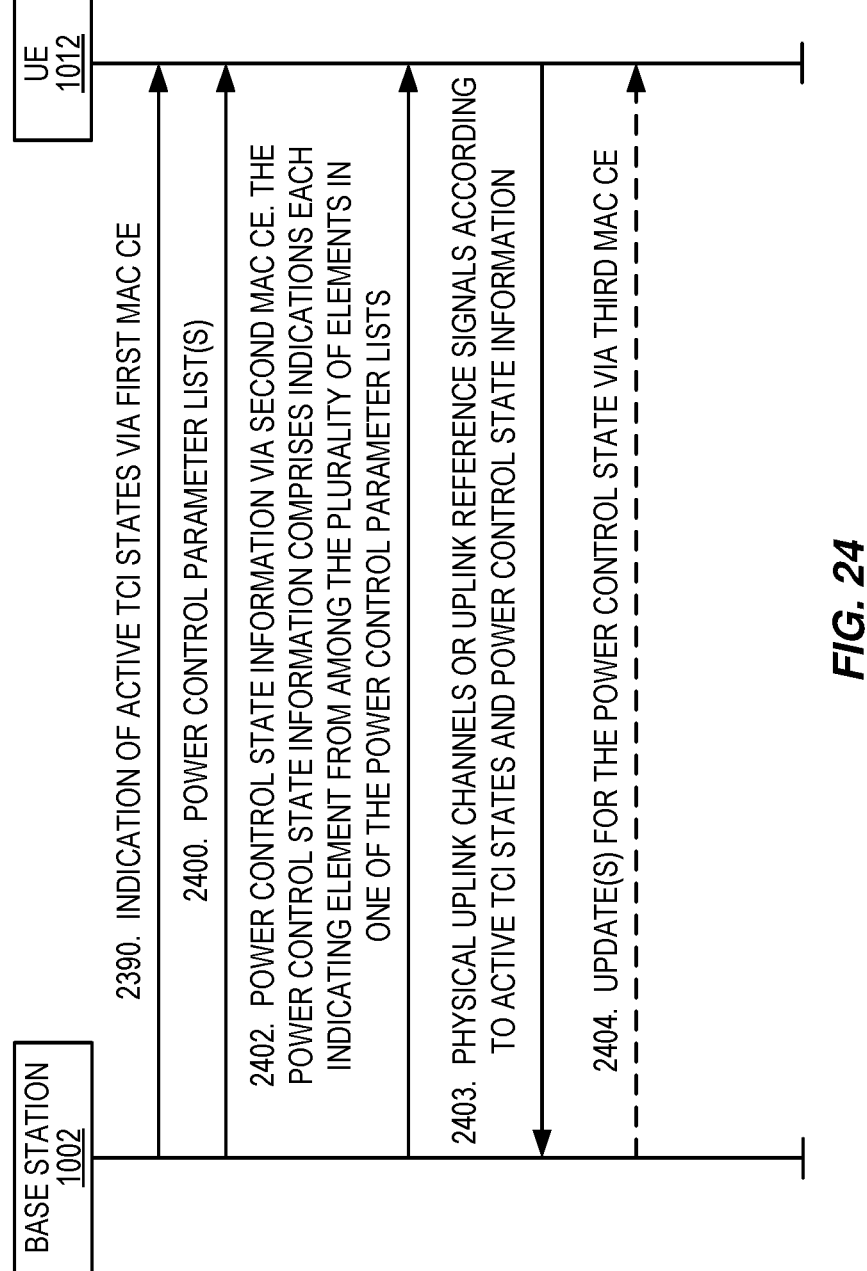

BASE STATION 1002

UE 1012

2390. INDICATION OF ACTIVE TCI STATES VIA FIRST MAC CE

2400. POWER CONTROL PARAMETER LIST(S)

2402. POWER CONTROL STATE INFORMATION VIA SECOND MAC CE. THE POWER CONTROL STATE INFORMATION COMPRISES INDICATIONS EACH INDICATING ELEMENT FROM AMONG THE PLURALITY OF ELEMENTS IN ONE OF THE POWER CONTROL PARAMETER LISTS

2403. PHYSICAL UPLINK CHANNELS OR UPLINK REFERENCE SIGNALS ACCORDING TO ACTIVE TCI STATES AND POWER CONTROL STATE INFORMATION

2404. UPDATE(S) FOR THE POWER CONTROL STATE VIA THIRD MAC CE

FIG. 24

MAC CE FOR POWER CONTROL FOR UPLINK TRANSMISSIONS TOWARDS MULTIPLE TRPs

RELATED APPLICATIONS

This application is a 35 U.S.C. § 371 national phase filing of International Application No. PCT/IB2021/057168, filed Aug. 4, 2021, which claims the benefit of provisional patent application Ser. No. 63/061,710, filed Aug. 5, 2020, the disclosures of which are hereby incorporated herein by reference in their entireties.

TECHNICAL FIELD

The present disclosure relates to activating or updating power control parameters associated with Uplink (UL) Transmission Configuration Indicator (TCI) states.

BACKGROUND

The next generation mobile wireless communication system (5G), or new radio (NR), will support a diverse set of use cases and a diverse set of deployment scenarios. The later includes deployment at both low frequencies (below 6 GHz) and very high frequencies (up to 10's of GHz).

NR Frame Structure and Resource Grid

NR uses Cyclic Prefix Orthogonal Frequency Division Multiplexing (CP-OFDM) in both downlink (DL) (i.e., from a network node (gNB) or a base station, to a user equipment (UE)) and uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of Δf=15 kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^{\mu})$ kHz where $\mu \in \{0,1,2,3,4\}$. Δf=15 kHz is the basic subcarrier spacing. The slot durations at different subcarrier spacings is given by $$\frac{1}{2^{\mu}} \text{ ms.}$$

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one resource element (RE).

DL PDSCH transmissions can be either dynamically scheduled, i.e., in each slot the gNB transmits Downlink Control Information (DCI) over PDCCH about which UE data is to be transmitted to and which RBs in the current downlink slot the data is transmitted on, or semi-persistently scheduled (SPS) in which periodic PDSCH transmissions are activated or deactivated by a DCI. Different DCI formats are defined in NR for DL PDSCH scheduling including DCI format 1_0, DCI format 1_1, and DCI format 1_2.

Similarly, UL PUSCH transmission can also be scheduled either dynamically or semi-persistently with uplink grants carried in PDCCH. NR supports two types of semi-persistent uplink transmission, i.e., type 1 configured grant (CG) and type 2 configured grant, where Type 1 configured grant is configured and activated by Radio Resource Control (RRC) while type 2 configured grant is configured by RRC but activated/deactivated by DCI. The DCI formats for scheduling PUSCH include DCI format 0_0, DCI format 0_1, and DCI format 0_2.

Transmission with Multiple Beams

In high frequency range (FR2), multiple radio frequency (RF) beams may be used to transmit and receive signals at a gNB and a UE. For each DL beam from a gNB, there is typically an associated best UE Rx beam for receiving signals from the DL beam. The DL beam and the associated UE Rx beam forms a beam pair. The beam pair can be identified through a so-called beam management process in NR.

A DL beam is identified by an associated DL Reference Signal (RS) transmitted in the beam, either periodically, semi-persistently, periodically. The DL RS for the purpose can be a Synchronization Signal (SS) and Physical Broadcast Channel (PBCH) block (SSB) or a Channel State Information Reference Signal (CSI-RS). For each DL RS, a UE can do an Rx beam sweep to determine the best Rx beam associate with the DL beam. The best Rx beam for each DL RS is then memorized by the UE. By measuring all the DL RSs, the UE can determine and report to the gNB the best DL beam to use for DL transmissions.

With the reciprocity principle, the same beam pair can also be used in the UL to transmit a UL signal to the gNB, often referred to as beam correspondence.

An example is shown in FIG. 3, where a gNB consists of a transmission/reception point (TRP) with two DL beams each associated with a CSI-RS and one SSB beam. Each of the DL beams is associated with a best UE Rx beam, i.e., Rx beam #1 is associated with the DL beam with CSI-RS #1 and Rx beam #2 is associated with the DL beam with CSI-RS #2.

Due to UE movement or environment change, the best DL beam for a UE may change over time and different DL beams may be used in different times. The DL beam used for a DL data transmission in PDSCH can be indicated by a Transmission Configuration Indicator (TCI) field in the corresponding DCI scheduling the PDSCH or activating the PDSCH in case of SPS. The TCI field indicates a TCI state which contains a DL RS associated with the DL beam. In the DCI, a PUCCH resource is indicated for carrying the corresponding Hybrid Automatic Repeat Request (HARQ) A/N. The UL beam for carrying the PUCCH is determined by a PUCCH spatial relation activated for the PUCCH resource. For PUSCH transmission, the UL beam is indicated indirectly by a Sounding Reference Signal Resource Indicator (SRI), which points to one or more SRS resources associated with the PUSCH transmission. The SRS resource(s) can be periodic, semi-persistent, or aperiodic. Each SRS resource is associated with an SRS spatial relation in which a DL RS (or another periodic SRS) is specified. The UL beam for the PUSCH is implicitly indicated by the SRS spatial relation(s).

Spatial Relations

Spatial relation is used in NR to refer to a spatial relationship between an UL channel or signal, such as PUCCH, PUSCH, and SRS, and a DL (or UL) RS, such as CSI-RS, SSB, or SRS. If an UL channel or signal is spatially related to a DL RS, it means that the UE should transmit the UL channel or signal with the same beam used in receiving the DL RS previously. More precisely, the UE should transmit the UL channel or signal with the same spatial domain transmission filter used for the reception of the DL RS.

If a UL channel or signal is spatially related to a UL SRS, then the UE should apply the same spatial domain transmission filter for the transmission for the UL channel or signal as the one used to transmit the SRS.

For PUCCH, up to 64 spatial relations can be configured for a UE and one of the spatial relations is activated by a Medium Access Control (MAC) Control Element (CE) for each PUCCH resource.

FIG. 4 is a PUCCH spatial relation information element (IE) in NR. This IE includes one of a SSB index, a CSI-RS resource identity (ID), and SRS resource ID as well as some power control parameters such as pathloss RS, closed-loop index, etc.

For each periodic and semi-persistent SRS resource or aperiodic SRS with usage "non-codebook" configured, its associated DL CSI-RS is RRC configured. For each aperiodic SRS resource with usage "codebook" configured, the associated DL RS is specified in an SRS spatial relation activated by a MAC CE. An example of SRS spatial relation IE is shown in FIG. 5, where one of a SSB index, a CSI-RS resource identity (ID), and SRS resource ID is configured.

For PUSCH, its spatial relation is defined by the spatial relation of the corresponding SRS resource(s) indicated by the SRI in the corresponding DCI.

Uplink Power Control in NR

Uplink power control is used to determine a proper transmit power for PUSCH, PUCCH and SRS to ensure that they are received by the gNB at an appropriate power level. The transmit power will depend on the amount of channel attenuation, the noise and interference level at the gNB receiver, and the data rate in case of PUSCH or PUCCH.

The uplink power control in NR consists of two parts, i.e., open-loop power control and closed-loop power control. Open-loop power control is used to set the uplink transmit power based on the pathloss estimation and some other factors including the target receive power, channel/signal bandwidth, modulation and coding scheme (MCS), fractional power control factor, etc.

Closed-loop power control is based on explicit power control commands received from the gNB. The power control commands are typically determined based on some UL measurements at the gNB on the actual received power. The power control commands may contain the difference between the actual and the target received powers. Either cumulative or non-cumulative closed-loop power adjustments are supported in NR. Up to two closed loops can be configured in NR for each UL channel or signal. A closed loop adjustment at a given time is also referred as a power control adjustment state.

With multi-beam transmission in FR2, pathloss estimation needs to also reflect the beamforming gains corresponding to an uplink transmit and receive beam pair used for the UL channel or signal. This is achieved by estimating the pathloss based on measurements on a downlink RS transmitted over the corresponding downlink beam pair. The DL RS is referred to as a DL pathloss RS. A DL pathloss RS can be a CSI-RS or SSB. For the example shown in FIG. 3, when a UL signal is transmitted in beam #1, CSI-RS #1 may be configured as the pathloss RS. Similarly, if a UL signal is transmitted in beam #2, CSI-RS #2 may be configured as the pathloss RS.

For a UL channel or signal (e.g., PUSCH, PUCCH, or SRS) to be transmitted in a UL beam pair associated with a pathloss RS with index n, its transmit power in transmission occasion within a slot in a bandwidth part (BWP) of a carrier frequency of a serving cell and a closed-loop index l (l=0,1) can be expressed as $$P(i, k, l) = \min \left\{ \begin{array}{l} P_{CMAX}(i) \\ P_{open-loop}(i, k) + P_{close(i-loop)}(i, l) \end{array} \right.$$

where $P_{CMAX}(i)$ is the configured UE maximum output power for the carrier frequency of the serving cell in transmission occasion i for the UL channel or signal. $P_{open-loop}(i,k)$ is the open loop power adjustment given below, $$P_{open-loop}(i, k) = P_O + P_{RB}(i) + \alpha PL(k) + \Delta(i)$$

where $P_O$ is the nominal target receive power for the UL channel or signal, $P_{RB}(i)$ is a power adjustment related to the number of RBs occupied by the channel or signal, PL is the pathloss estimation based on a pathloss reference signal, $\alpha$ is fractional pathloss compensation factor, and $\Delta(i)$ is a power adjustment related to MCS. $P_{closed-loop}(i,l)$ is given below:

$$P_{closed-loop}(i, l) =$$

$$\left\{ \begin{array}{l} P_{closed-loop}(i - i_0, l) + \sum_{m=0}^{M} \delta(m, l); \text{ if accumulation is enabled} \\ \delta(i, l); \text{ if accumulation is disabled (i.e., absolute is enabled)} \end{array} \right.$$

where $\delta(i,l)$ is a transmit power control (TPC) command value included in a DCI format associated with the UL channel or signal at transmission occasion i and closed-loop l;

$$\sum_{m=0}^{M} \delta(m, l)$$

is a sum of TPC command values that the UE receives for the channel or signal and the associated closed-loop l since the TPC command for transmission occasion i-$i_0$.

Note that power control parameters $P_O$, $P_{RB}(i)$, $\alpha$, PL, $\Delta(i)$, $\delta(i,l)$ are generally configured separately for each UL channel or signal (e.g., PUSCH, PUCCH, and SRS) and may be different for different UL channels or signals.

Power Control for SRS

For SRS, a pathloss RS and other power control parameters (e.g., $P_O$, $\alpha$, etc.) are configured for each SRS resource set. Note that for each BWP in a serving cell, there can only be one SRS resource set configured with usage set to either "codebook" or "non-codebook" in NR.

For SRS closed-loop power control, a UE can have a dedicated closed loop for SRS or share the closed loop(s) of PUSCH in the same serving cell. This is configured by a higher layer parameter srs-PowerControlAdjustmentStates in each SRS resource set to select one out of three options, i.e., use the dedicated closed loop, the first closed loop for PUSCH, or the second closed loop for PUSCH. In case that the closed loop(s) are shared with PUSCH, $P_{closed-loop}(i,l)$ for PUSCH applies to SRS transmitted in the SRS resource set.

For the dedicated loop configured for SRS, $\delta(m,l)$ corresponds to a TPC command received in a PDCCH with DCI format 2_3 for the UE. The mapping between the 2 bits TPC command field in DCI and power adjustment values in dB are shown in Table 1.

Default Pathloss RS:

If pathloss RS is not configured in an SRS resource set, and SRS_SpatialRelationInfo is not configured in an SRS resource, but the UE is configured with enableDefaultBeamPlForSRS, then the pathloss RS is a periodic RS resource with 'QCL-TypeD' in the TCI state of a CORESET with the lowest index, if CORESETs are configured in the active DL BWP, or in the active PDSCH TCI state with lowest ID, if CORESETs are not configured in the active DL BWP.

Power Control for PUSCH

For PUSCH, $P_O=P_{O,nominal\_PUSCH}+P_{O,UE\_PUSCH}$, where $P_{O,nominal\_PUSCH}$ is RRC configured, and $P_{O,UE\_PUSCH}$ can be dynamically selected. For dynamically scheduled PUSCH, as illustrated in FIG. 6, a UE is configured by RRC with a list of SRI-PUSCH-PowerControl elements among which one is selected by the SRI field in DCI (e.g., DCI formats 0_0, 0_1, 0_2). Each SRI-PUSCH-PowerControl consists of a PUSCH pathloss RS, one of two closed-loops, and a set of $P_{O,UE\_PUSCH}$ $\alpha$. $\delta(i,l)$ is indicated in a 2-bit TPC command field of the same DCI, where the mapping between the field value and the dB value is shown in Table 1.

In addition to TPC command field in DCI scheduling a PUSCH, PUSCH power control for a group of UEs is also supported by DCI format 2_2 with CRC scrambled by TPC-PUSCH-RNTI, in which power adjustments for multiple UEs can be signaled simultaneously.

TABLE 1

Mapping of TPC Command Field in DCI formats 0_0,
0_1, 0_2, 2_2 for PUSCH or DCI format 2_3 for SRS
to absolute and accumulated values.

| TPC Command Field | Accumulated $\delta(m,l)$ [dB] | Absolute $\delta(m,l)$ [dB] |
|---|---|---|
| 0 | −1 | −4 |
| 1 | 0 | −1 |
| 2 | 1 | 1 |
| 3 | 3 | 4 |

For PUSCH with configured grant, $P_O$, $\alpha$ and closed loop index are semi-statically configured by RRC. For CG with RRC configured pathloss RS, the RS is used for pathloss estimation, otherwise, the pathloss RS indicated in the DCI activating the CG PUSCH is used for pathloss estimation.

Default Pathloss RS:

If the PUSCH transmission is scheduled by a DCI format 0_0, and if the UE is configured with PUCCH-SpatialRelationInfo for a PUCCH resource with a lowest index in the BWP of the serving cell, the UE uses the same pathloss RS resource for PUSCH as for a PUCCH transmission in the PUCCH resource with the lowest index.

If SRI field is not present in a DCI format 0_1 or DCI format 0_2 scheduling a PUSCH, or SRI-PUSCH-Power-Control is not provided to the UE, or a PUSCH scheduled by DCI format 0_0 and PUCCH-SpatialRelationInfo is not configured, the pathloss RS is the one contained in the PUSCH-PathlossReferenceRS-Id with the lowest index value.

If the PUSCH transmission is scheduled by a DCI format 0_0, and if the UE is not configured with PUCCH-SpatialRelationInfo for a PUCCH resource, and if the UE is configured with enableDefaultBeamPlForPUSCH0_0, the UE in the BWP of the serving cell, the pathloss RS is then a periodic RS resource with 'QCL-TypeD' in a TCI state or QCL assumption of a CORESET with the lowest index in the active DL BWP of the primary cell.

Power Control for PUCCH

For PUCCH, $P_O=P_{O,nominal\_PUCCH}+P_{O,UE\_PUCCH}$ and $\alpha=1$, where $P_{O,nominal\_PUCCH}$ is RRC configured cell specific parameter and $P_{O,UE\_PUCCH}$ is a UE specific parameter and can vary among different PUCCH resources. A UE is configured with a list of up to 8 $P_{O,UE\_PUCCH}$ (each with a P0-PUCCH-Id) and a list of up to 8 pathloss RS (each with a pucch-PathlossReferenceRS-Id). For each PUCCH resource, a PUCCH spatial relation (i.e., PUCCH-SpatialRelationInfo) is activated in which a closed-loop index, a pathloss RS (from the corresponding list), and a $P_{O,UE\_PUCCH}$ (from the corresponding list) are configured.

For closed loop power adjustment for PUCCH, up to two control loops may be configured. Accumulation is always enabled. TPC command for PUCCH HARQ A/N can be received in one of DCI formats 1_0, 1_1, or 1_2 scheduling the corresponding PDSCH or in DCI format 2_2 when the DCI is scrambled with TPC-PUCCH-RNTI. The mapping between a TPC field value in DCI and a power correction value in dB is shown in Table 2.

TABLE 2

Mapping of TPC Command Field in DCI format 1_0
or DCI format 1_1 or DCI format 1_2 or DCI format
2_2 to accumulated $\delta(m,l)$ values for PUCCH

| TPC Command Field | Accumulated $\delta(m,l)$ [dB] |
|---|---|
| 0 | −1 |
| 1 | 0 |
| 2 | 1 |
| 3 | 3 |

Default Pathloss RS:

If PUCCH spatial relation is not configured but a list of pathloss RS is configured for PUCCH, then the pathloss RS in the first one in the list is used.

If both the list of pathloss RS and PUCCH-SpatialRelationInfo are not configured, but the UE is configured with enableDefaultBeamPlForPUCCH, then the pathloss RS is a periodic RS resource with 'QCL-TypeD' in the TCI state of a CORESET with the lowest index in the active DL BWP of the primary cell.

UL Transmission to Multiple TRPs

PDSCH transmission with multiple TRPs has been introduced in 3GPP for NR Rel-16, in which a transport block may be transmitted over multiple TRPs to improve transmission reliability.

In NR Rel-17, it has been proposed to introduce UL enhancement with multiple TRPs by transmitting a PUCCH or PUSCH towards to different TRPs as shown in FIG. 7, either simultaneously or in different times.

In one scenario, multiple PUCCH/PUSCH transmissions each towards a different TRP may be scheduled by a single DCI. For example, multiple spatial relations may be activated for a PUCCH resource and the PUCCH resource may be signaled in a DCI scheduling a PDSCH. The HARQ A/N associated with the PDSCH is then carried by the PUCCH which is then repeated multiple times either within a slot or over multiple slots, each repetition is towards a different TRP. An example of a single DCI triggered PUCCH repetitions each towards a different TRP is shown in FIG. 8, where a PDSCH is scheduled by a DCI and the corresponding HARQ A/N is sent in a PUCCH which is repeated twice in time, one towards TRP #1 and the other towards TRP #2. Each TRP is associated with a PUCCH spatial relation.

An example of PUSCH repetitions each towards a different TRP is shown in FIG. 9, where two PUSCH repetitions for a same TB are scheduled by a single DCI, each PUSCH occasion is towards a different TRP. Each TRP is associated with an SRI or a UL TCI state signaled in the UL DCI.

TCI States

DL TCI States

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for tracking RS (TRS) and the PDSCH DMRS. When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

For dynamic beam and TRP indication, a UE can be configured through RRC signaling with up to 128 Transmission Configuration Indicator (TCI) states for PDSCH in FR2 and up to 8 in FR1, depending on UE capability. Each TCI state contains QCL information, i.e. one or two DL RSs, each RS associated with a QCL type. The TCI states can be interpreted as a list of possible DL beams/TRPs for PDSCH transmissions to the UE.

For PDSCH transmission, up to 8 TCI states or pair of TCI states may be activated and a UE may be dynamically indicated by a TCI codepoint in DCI one or two of the activated TCI states for PDSCH reception. The UE shall use the TCI-State according to the value of the 'Transmission Configuration Indication' field in the detected PDCCH with DCI for determining PDSCH antenna port quasi co-location.

UL TCI States

The existing way of using spatial relation for UL beam indication in NR is cumbersome and inflexible. To facilitate UL beam selection for UEs equipped with multiple panels, a unified TCI framework for UL fast panel selection is to be evaluated and introduced in NR Rel-17. Similar to DL, where TCI states are used to indicate DL beams/TRPs, TCI states may also be used to select UL panels and beams used for UL transmissions (i.e., PUSCH, PUCCH, and SRS).

It is envisioned that UL TCI states are configured by higher layers (i.e., RRC) for a UE in number of possible ways. In one scenario, UL TCI states are configured separately from the DL TCI states and each uplink TCI state may contain a DL RS (e.g., NZP CSI-RS or SSB) or an UL RS (e.g., SRS) to indicate a spatial relation. The UL TCI states can be configured either per UL channel/signal or per BWP such that the same UL TCI states can be used for PUSCH, PUCCH, and SRS. Alternatively, a same list of TCI states may be used for both DL and UL, hence a UE is configured with a single list of TCI states for both UL and DL beam indication. The single list of TCI states in this case can be configured either per UL channel/signal or per BWP information elements.

SUMMARY

Embodiments of a Medium Access Control (MAC) Control Element (CE) for power control for uplink transmissions towards multiple transmission/reception points (TRPs) are disclosed herein. In one embodiment, a method performed by a wireless communication device comprises receiving an indication of one or more activate Transmission Configuration Indicator (TCI) states for a plurality of physical uplink channels or uplink reference signals via a first MAC CE, message; receiving, for each of the plurality of physical uplink channels or uplink reference signals, one or more power control parameter lists each comprising a plurality of elements, where each element in the one or more power control parameter lists comprises one or more values for one or more respective power control parameters; obtaining, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state; and transmitting each of the plurality of physical uplink channels or uplink reference signals according to the one or more active TCI states and the respective power control state information.

Embodiments of the solutions described herein may enable more flexibility in updating the power control parameters associated with an uplink (UL) Transmission Configuration Indicator (TCI) state for a UE when the UL TCI state is applicable to physical channels or signals, such as Physical Uplink Control Channel (PUCCH), Physical Uplink Shared Channel (PUSCH), and Sounding Reference Signal (SRS).

In one embodiment, receiving an indication of one or more active TCI states comprises receiving an indication in a Downlink Control Information (DCI) format in addition to the first MAC CE message.

In one embodiment, the plurality of physical uplink channels can be two or more of a PUSCH, a PUCCH; and the plurality of uplink reference signals can be two or more of an SRS.

In one embodiment, receiving one or more power control parameter lists comprises receiving the one or more power control parameter lists via Radio Resource Control (RRC) signaling.

In one embodiment, the first MAC CE message and the second MAC CE message are separate control messages.

In one embodiment, the first MAC CE message and the second MAC CE message are the same control message.

In one embodiment, the method further comprises receiving an update via a third MAC CE message for the power control state. The update comprises one or more new indications each indicating a new particular element from among the plurality of elements in one of the one or more power control parameter lists such that the one or more values for the one or more respective power control parameters comprised in the new particular element are used to replace the existing one or more values for the one or more respective power control parameters in the power control state.

In one embodiment, the third MAC CE message is the same as the second MAC CE message.

In one embodiment, the update of a power control parameter is to be applied to the power control state and one or more additional power control states indicted in the third MAC CE message.

In one embodiment, the plurality of elements in each of the one or more power control parameter lists comprise different values for the one or more respective power control parameters.

In one embodiment, the one or more power control parameters comprise one or more of $P_0$, $\alpha$, a closed loop index, and a pathloss reference signal (RS).

In one embodiment, the method further comprises receiving, for each of the plurality of physical uplink channels or uplink reference signals, a mapping between one of the one or more active TCI states and one of a plurality of power control states for the respective physical uplink channel or uplink reference signal.

In one embodiment, the power control state information further comprises a list of one or more active TCI state identifiers associated to the power control state.

In one embodiment, each of the plurality of elements of the one or more power control parameter lists comprises a set of values for two or more power control parameters.

In one embodiment, the two or more power control parameters comprise: $P_0$ and $\alpha$; $P_0$ and a closed loop index; $\alpha$ and a closed loop index; or $P_0$, $\alpha$, and a closed loop index.

In one embodiment, a wireless communication device is adapted to receive an indication of one or more activate TCI states for a plurality of physical uplink channels or uplink reference signals via a first MAC CE, message; receive, for each of the plurality of physical uplink channels or uplink reference signals, one or more power control parameter lists each comprising a plurality of elements, where each element in the one or more power control parameter lists comprises one or more values for one or more respective power control parameters; obtain, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state; and transmit each of the plurality of physical uplink channels or uplink reference signals according to the one or more active TCI states and the respective power control state information.

In one embodiment, a wireless communication device comprises one or more transmitters; one or more receivers; and processing circuitry associated with the one or more transmitters and the one or more receivers, the processing circuitry configured to cause the wireless communication device to receive an indication of one or more activate TCI states for a plurality of physical uplink channels or uplink reference signals via a first MAC CE, message; receive, for each of the plurality of physical uplink channels or uplink reference signals, one or more power control parameter lists each comprising a plurality of elements, where each element in the one or more power control parameter lists comprises one or more values for one or more respective power control parameters; obtain, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state; and transmit each of the plurality of physical uplink channels or uplink reference signals according to the one or more active TCI states and the respective power control state information.

In one embodiment, a method performed by a wireless communication device comprises obtaining a first power control parameter list comprising a plurality of elements, where each element in the first power control parameter list comprises one or more values for one or more respective power control parameters; and receiving information that indicates an association between an activated TCI state and a particular element from among the plurality of elements in the first power control parameter list.

In one embodiment, the method further comprises using the one or more values for the one or more respective power control parameters in the particular element of the first power control parameter list for an uplink transmission associated to the activated TCI state.

In one embodiment, receiving the information that indicates the association between the activated TCI state and the particular element from among the plurality of elements in the first power control parameter list comprises: receiving a message that activates the TCI state, the TCI state being mapped to a respective TCI state to power control identifier; and receiving, for the TCI state to power control identifier, an indication of the particular element from among the plurality of elements in the first power control parameter list such that the one or more values for the one or more respective power control parameters comprised in the particular element of the first power control parameter list are indicated for the TCI state to power control identifier (ID) and thus associated to the activated TCI state.

In one embodiment, receiving the indication of the particular element from among the plurality of elements in the first power control parameter list for the TCI state to power control identifier comprises receiving the indication in a MAC CE.

In one embodiment, the method further comprises obtaining a second power control parameter list comprising a plurality of elements, where each element in the second power control parameter list comprises one or more values for one or more respective second power control parameters, the one or more respective second power control parameters being different than the one or more respective first power control parameters. The received information further indicates an association between the activated TCI state and a particular element from among the plurality of elements in the second power control parameter list.

In one embodiment, the method further comprises receiving a message that activates the TCI state, the TCI state being mapped to a respective TCI state to power control identifier; receiving, for the TCI state to power control identifier, a first indication of the particular element from among the plurality of elements in the first power control parameter list such that the one or more values for the one or more respective power control parameters comprised in the particular element of the first power control parameter list are indicated for the TCI state to power control ID and thus associated to the activated TCI state; and a second indication of the particular element from among the plurality of elements in the second power control parameter list such that the one or more values for the one or more respective power control parameters comprised in the particular element of the second power control parameter list are indicated for the TCI state to power control ID and thus associated to the activated TCI state.

In one embodiment, the first indications and the second indications are received via separate MAC CEs or a single MAC CE.

In one embodiment, the message that activates the TCI state is a MAC CE, and the indication or the first and second indications are comprised in the MAC CE.

In one embodiment, the message that activates the TCI state is a MAC CE, and receiving the information that indicates the association between the activated TCI state and the particular element from among the plurality of elements in the first power control parameter list comprises receiving the information in the MAC CE that activates the TCI state.

In one embodiment, receiving the information that indicates the association between the activated TCI state and the particular element from among the plurality of elements in the first power control parameter list comprises receiving information that indicates one or more uplink channels for which the association applies.

In one embodiment, a wireless communication device is adapted to obtain a first power control parameter list comprising a plurality of elements, where each element in the first power control parameter list comprises one or more values for one or more respective power control parameters; and receive information that indicates an association between an activated TCI state and a particular element from among the plurality of elements in the first power control parameter list.

In one embodiment, a wireless communication device comprises one or more transmitters; one or more receivers; and processing circuitry associated with the one or more transmitters and the one or more receivers, the processing circuitry configured to cause the wireless communication device to obtain a first power control parameter list comprising a plurality of elements, where each element in the first power control parameter list comprises one or more values for one or more respective power control parameters; receive information that indicates an association between an activated TCI state and a particular element from among the plurality of elements in the first power control parameter list.

Corresponding embodiments of a base station and methods performed by the base station are also disclosed.

In one embodiment, a method performed by a base station comprises providing, to a UE, an indication of one or more activate TCI states for a plurality of physical uplink channels or uplink reference signals via a first MAC CE message; providing, to the UE, for each of the plurality of physical uplink channels or uplink reference signals, one or more power control parameter lists each comprising a plurality of elements, where each element in the one or more power control parameter lists comprises one or more values for one or more respective power control parameters; and providing, to the UE, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state.

In one embodiment, providing an indication of one or more active TCI states comprises receiving an indication in a DCI format in addition to the first MAC CE message.

In one embodiment, the plurality of physical uplink channels can be two or more of a PUSCH, a PUCCH; and the plurality of uplink reference signals can be two or more of an SRS.

In one embodiment, providing one or more power control parameter lists comprises receiving the one or more power control parameter lists via RRC signaling.

In one embodiment, the first MAC CE message and the second MAC CE message are separate control messages.

In one embodiment, the first MAC CE message and the second MAC CE message are the same control message.

In one embodiment, the method further comprises providing an update via a third MAC CE message for the power control state. The update comprises one or more new indications each indicating a new particular element from among the plurality of elements in one of the one or more power control parameter lists such that the one or more values for the one or more respective power control parameters comprised in the new particular element are used to replace the existing one or more values for the one or more respective power control parameters in the power control state.

In one embodiment, the third MAC CE message is the same as the second MAC CE message.

In one embodiment, the update of a power control parameter is to be applied to the power control state and one or more additional power control states indicted in the third MAC CE message.

In one embodiment, the plurality of elements in each of the one or more power control parameter lists comprise different values for the one or more respective power control parameters.

In one embodiment, the one or more power control parameters comprise one or more of $P_0$, $\alpha$, a closed loop index, and a pathloss reference signal (RS).

In one embodiment, the method further comprises providing, for each of the plurality of physical uplink channels or uplink reference signals, a mapping between one of the one or more active TCI states and one of a plurality of power control states for the respective physical uplink channel or uplink reference signal.

In one embodiment, the power control state information further comprises a list of one or more active TCI state identifiers associated to the power control state.

In one embodiment, each of the plurality of elements of the one or more power control parameter lists comprises a set of values for two or more power control parameters.

In one embodiment, the two or more power control parameters comprise: $P_0$ and $\alpha$; $P_0$ and a closed loop index; $\alpha$ and a closed loop index; or $P_0$, $\alpha$, and a closed loop index.

In one embodiment, a base station is adapted to provide, to a UE, an indication of one or more activate TCI states for a plurality of physical uplink channels or uplink reference signals via a first MAC CE message; provide, to the UE, for each of the plurality of physical uplink channels or uplink reference signals, one or more power control parameter lists each comprising a plurality of elements, where each element in the one or more power control parameter lists comprises one or more values for one or more respective power control parameters; and provide, to the UE, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state.

In one embodiment, a base station comprises processing circuitry configured to cause the base station to provide, to a UE, an indication of one or more activate TCI states for a plurality of physical uplink channels or uplink reference signals via a first MAC CE message; provide, to the UE, for each of the plurality of physical uplink channels or uplink reference signals, one or more power control parameter lists each comprising a plurality of elements, where each element in the one or more power control parameter lists comprises one or more values for one or more respective power control parameters; and provide, to the UE, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state.

In one embodiment, a method performed by a base station comprises providing, to a UE, a first power control parameter list comprising a plurality of elements, where each element in the first power control parameter list comprises one or more values for one or more respective power control parameters; and providing, to the UE, information that indicates an association between an activated TCI state and a particular element from among the plurality of elements in the first power control parameter list.

In one embodiment, providing the information that indicates the association between the activated TCI state and the particular element from among the plurality of elements in the first power control parameter list comprises sending, to the UE, a message that activates the TCI state, the TCI state being mapped to a respective TCI state to power control identifier; and sending, to the UE for the TCI state to power control identifier, an indication of the particular element from among the plurality of elements in the first power control parameter list such that the one or more values for the one or more respective power control parameters comprised in the particular element of the first power control parameter list are indicated for the TCI state to power control ID and thus associated to the activated TCI state.

In one embodiment, sending the indication of the particular element from among the plurality of elements in the first power control parameter list for the TCI state to power control identifier comprises sending the indication in a MAC CE.

In one embodiment, providing, to the UE, a second power control parameter list comprising a plurality of elements, where each element in the second power control parameter list comprises one or more values for one or more respective second power control parameters, the one or more respective second power control parameters being different than the one or more respective first power control parameters. The provided information further indicates an association between the activated TCI state and a particular element from among the plurality of elements in the second power control parameter list.

In one embodiment, sending, to the UE, a message that activates the TCI state, the TCI state being mapped to a respective TCI state to power control identifier; sending, to the UE for the TCI state to power control identifier: a first indication of the particular element from among the plurality of elements in the first power control parameter list such that the one or more values for the one or more respective power control parameters comprised in the particular element of the first power control parameter list are indicated for the TCI state to power control ID and thus associated to the activated TCI state; and a second indication of the particular element from among the plurality of elements in the second power control parameter list such that the one or more values for the one or more respective power control parameters comprised in the particular element of the second power control parameter list are indicated for the TCI state to power control ID and thus associated to the activated TCI state.

In one embodiment, the first and second indications are received via separate MAC CEs or a single MAC CE.

In one embodiment, the message that activates the TCI state is a MAC CE, and the indication or the first and second indications are comprised in the MAC CE.

In one embodiment, the message that activates the TCI state is a MAC CE, and providing the information that indicates the association between the activated TCI state and the particular element from among the plurality of elements in the first power control parameter list comprises providing the information in the MAC CE that activates the TCI state.

In one embodiment, providing the information that indicates the association between the activated TCI state and the particular element from among the plurality of elements in the first power control parameter list comprises providing information that indicates one or more uplink channels for which the association applies.

In one embodiment, a base station is adapted to provide, to a UE, a first power control parameter list comprising a plurality of elements, where each element in the first power control parameter list comprises one or more values for one or more respective power control parameters; and provide, to the UE, information that indicates an association between an activated TCI state and a particular element from among the plurality of elements in the first power control parameter list.

In one embodiment, a base station comprises processing circuitry configured to cause the base station to provide, to a UE, a first power control parameter list comprising a plurality of elements, where each element in the first power control parameter list comprises one or more values for one or more respective power control parameters; and provide, to the UE, information that indicates an association between an activated TCI state and a particular element from among the plurality of elements in the first power control parameter list.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a Physical Uplink Control Channel (PUCCH) spatial relation information element (IE) that a User Equipment (UE) can be configured in NR, it includes one of a Synchronization Signal Block (SSB) index, a CSI-RS resource identity (ID), and Sounding Reference Signal (SRS) resource ID as well as some power control parameters such as pathloss RS, closed-loop index, etc.;

FIG. 5 illustrates an example where one of a SSB index, a CSI-RS resource ID, and SRS resource ID is configured, according to some embodiments of the present disclosure;

Figure 6:
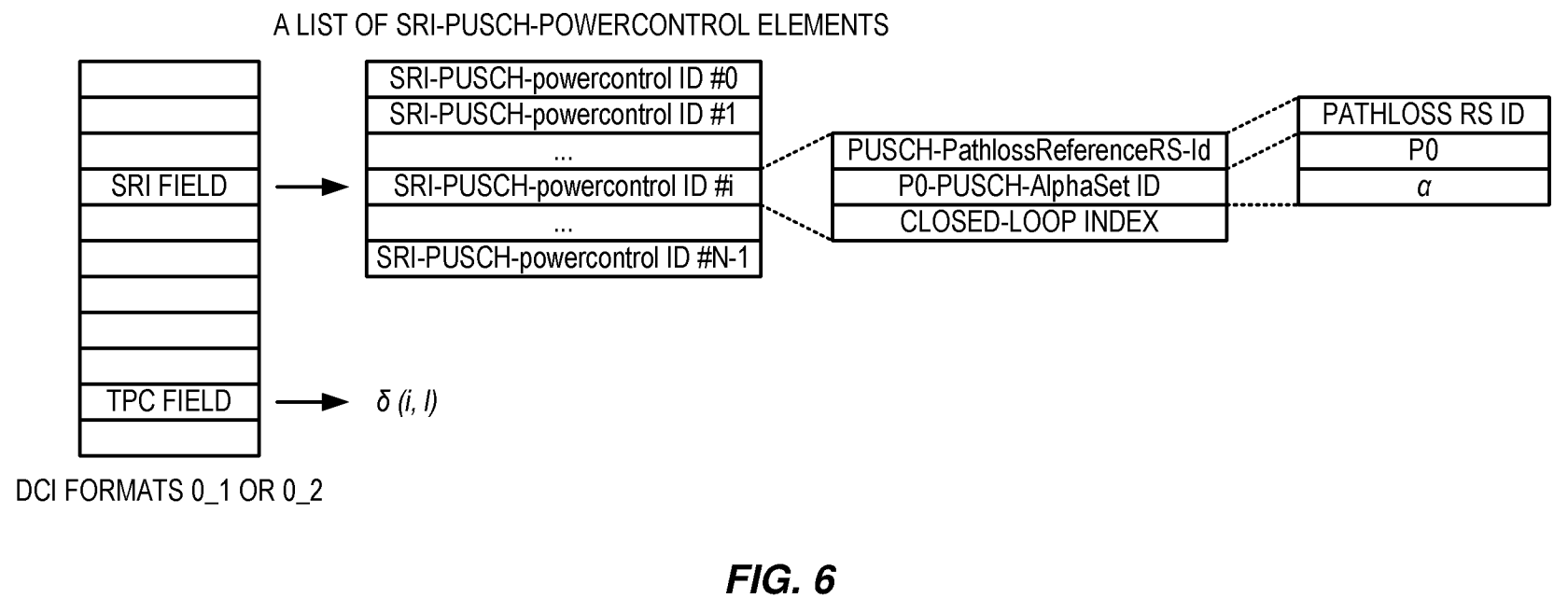

FIG. 6 illustrates dynamically scheduled PUSCH, where a UE is configured by RRC with a list of P0-PUSCH-Alpha sets and a list of SRI-PUSCH-PowerControl information elements, according to some embodiments of the present disclosure;

FIG. 11 illustrates an example where separate lists of values for P_O and α are configured, and a pointer (i.e., P0 ID and α ID) to one value in each of these lists is defined per power control state, according to some embodiments of the present disclosure;

FIG. 12 illustrates an example where, in addition to traditional power control parameters, a list of Transmission Configuration Indicator (TCI) states is configured or associated to each power control state, according to some embodiments of the present disclosure;

FIG. 13 illustrates an example where a list of a pair of P_O, α is configured, and a pointer to one pair in the list per power control state indicates which values to apply, according to some embodiments of the present disclosure;

FIG. 14 illustrates an example of a MAC CE for updating item X in the power control state, according to some embodiments of the present disclosure;

FIG. 15 illustrates an example of a MAC CE used to update item X in more than one power control state, according to some embodiments of the present disclosure;

FIG. 18 illustrates an example where two "TCI state to power control" mappings are updated, according to some embodiments of the present disclosure;

FIG. 19 illustrates an example where associations between UL TCI states and power control states are done in each power control state, according to some embodiments of the present disclosure;

FIG. 20 illustrates an example where a TCI state is activated, its associated power control state ID is also indicated for each UL channel, according to some embodiments of the present disclosure;

FIG. 21 illustrates an example where an SRS resource set is indicated for each activated TCI state, according to some embodiments of the present disclosure;

FIG. 22 illustrates an example where a power control state ID is associated with each UL channel/UL resource set for each UL TCI state, according to some other embodiments of the present disclosure;

FIG. 23 illustrates an example where power control parameters are updated to a single 'TCI state to power control' ID, according to some embodiments of the present disclosure;

FIG. 24 illustrates an example of an operation of a base station and a UE, according to some other embodiments of the present disclosure;

DETAILED DESCRIPTION

Figures 1, 2:
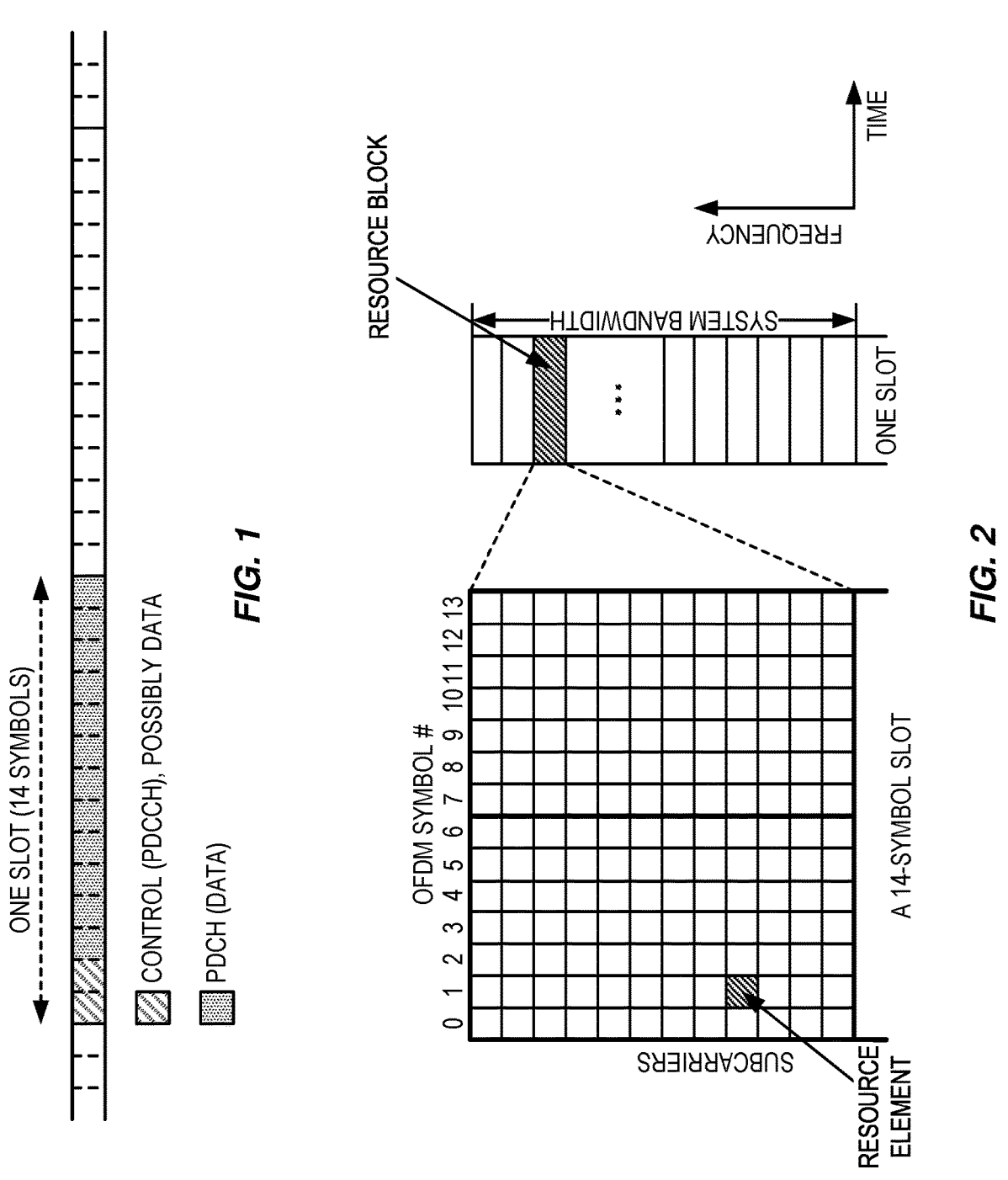
FIG. 1 illustrates data scheduling in New Radio (NR) which is typically in slot basis, where the first two symbols contain physical downlink control channel (PDCCH) and the rest contains physical shared data channel, either Physical Downlink Shared Channel (PDSCH) or Physical Uplink Shared Channel (PUSCH)
FIG. 2 illustrates a basic NR physical time-frequency resource grid where only one Resource Block (RB) within a 14-symbol slot is shown. One Orthogonal Frequency Division Multiplexing (OFDM) subcarrier during one OFDM symbol interval forms one Resource Element (RE)
Figure 3:
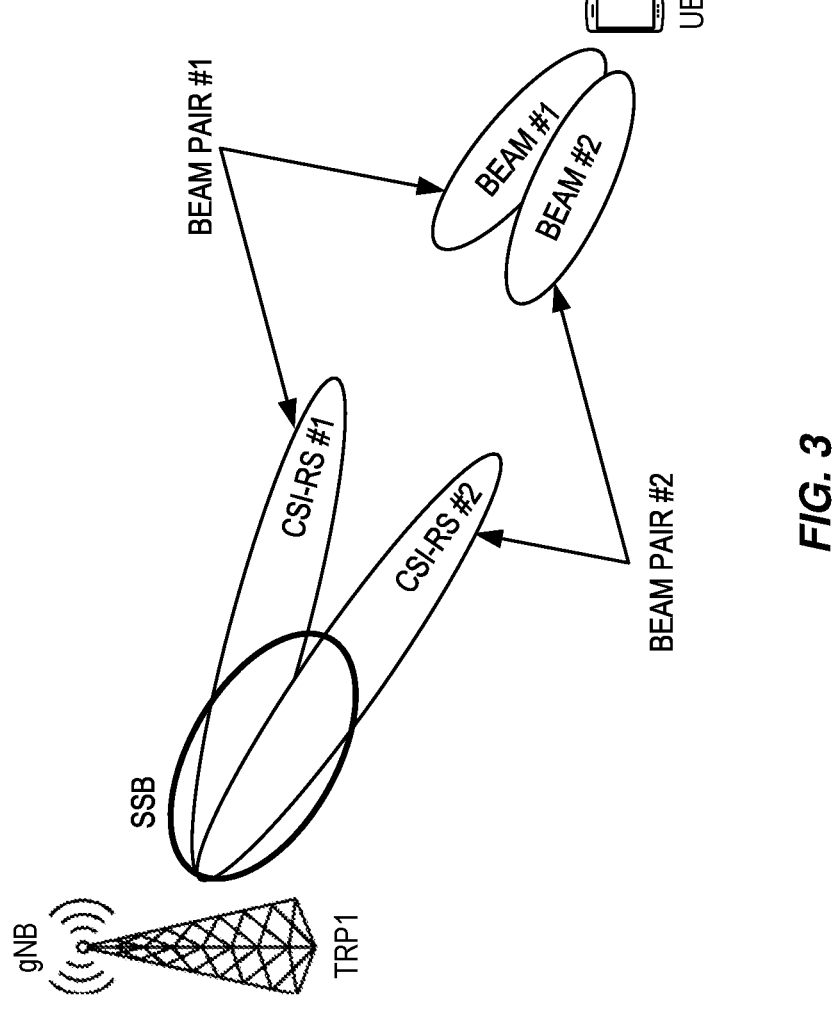
FIG. 3 illustrates an example where a gNB consists of a transmission/reception point (TRP) with two downlink (DL) beams each associated with a Channel State Information Reference Signal (CSI-RS)
Figure 7:
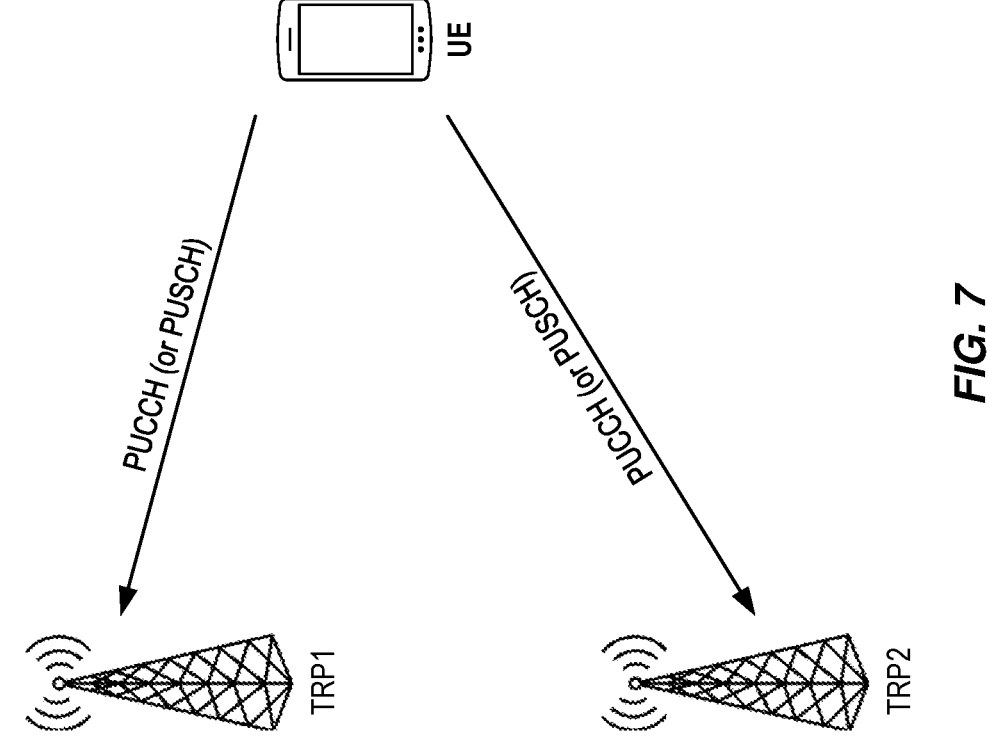
FIG. 7 illustrates transmitting a PUCCH or PUSCH towards different TRPs, either simultaneously or in different times, according to some embodiments of the present disclosure.
Figures 8, 9:
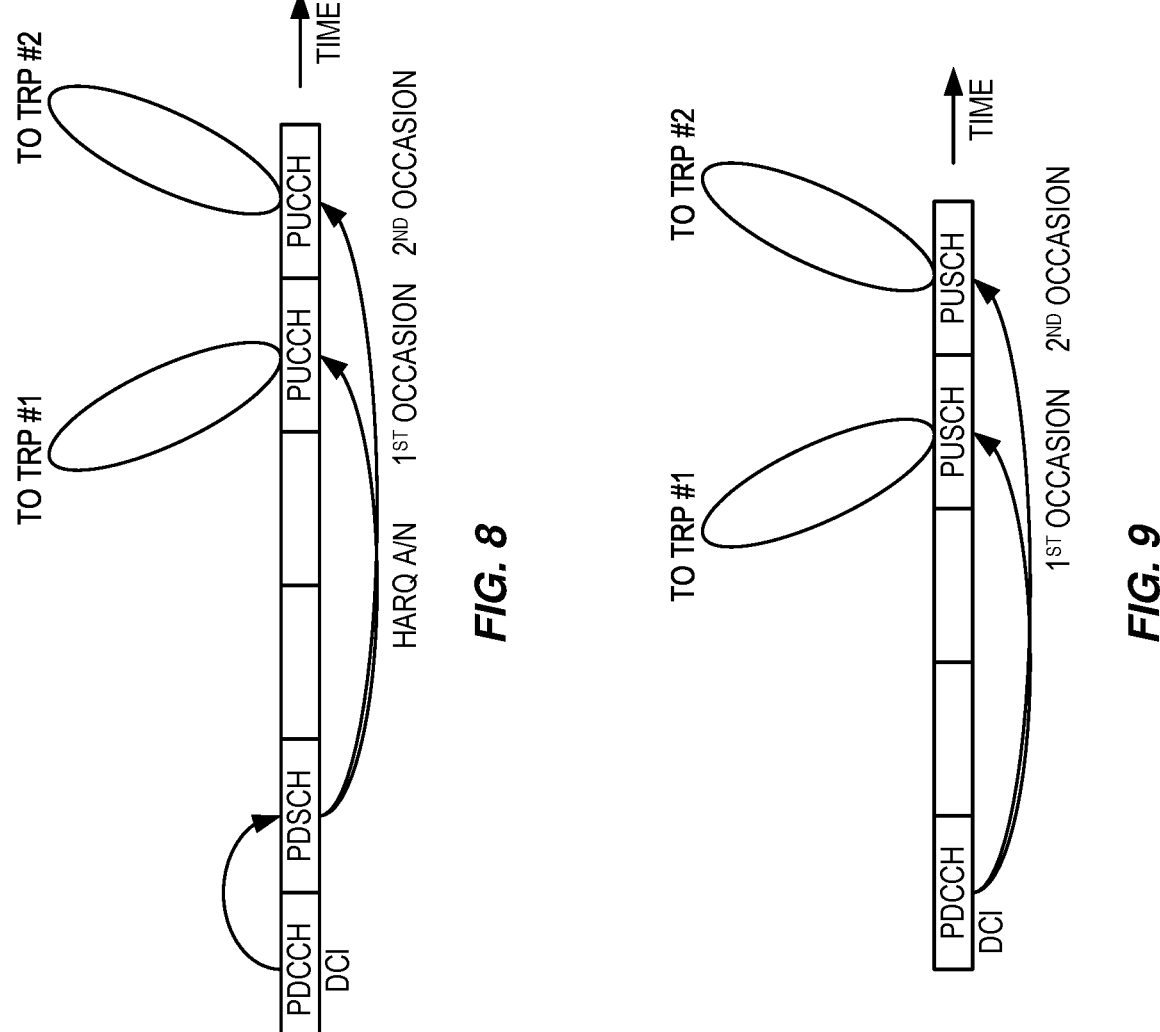
FIG. 8 illustrates an example where a PDSCH is scheduled by a Downlink Control Information (DCI) and the corresponding Hybrid Automatic Repeat Request (HARQ) A/N is sent in a PUCCH which is repeated twice in time, one towards TRP #1 and the other towards TRP #2, according to some embodiments of the present disclosure.
FIG. 9 illustrates an example of PUSCH repetitions where two PUSCH repetitions for a same TB are scheduled by a single DCI, each PUSCH occasion is towards a different TRP, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In PCT Application PCT/IB2021/0055717 (filed Jun. 29, 2021) (hereinafter "PCT0055717 Application"), which claims the benefit of U.S. Provisional Patent Application Ser. No. 63/044,851, the following is proposed for uplink power control for multiple TRPs when UL TCI states are introduced for UL beam indication:

associating each UL TCI state with a set of power control parameters, and different set of power control parameters being associated with a UL TCI state for PUCCH, PUSCH, and SRS.

Although the PCT0055717 Application discusses associating UL TCI state with a set of power control parameters, it does not solve the issue of how to efficiently signal the association of UL TCI state with different power control parameters which is an open problem. Another related problem on how signal the efficient update of power control parameters associated with a UL TCI state is also an open problem that needs to be solved.

Certain aspects of the present disclosure and their embodiments may provide solutions to the aforementioned or other challenges. Embodiments of the following solutions are proposed in this disclosure:

A process to have a signaling (e.g., a Medium Access Control Element (MAC CE)) that updates item X in "uplink power control state", or "uplink transmission state", that may be defined per UL channel (e.g., PUSCH, SRS, and/or PUCCH) or defined in common for all or a subset of UL channels (e.g., all or a subset of PUSCH, SRS, and PUCCH).

A process for efficient signaling (e.g., efficient MAC CE signaling) to update power control parameters associated with UL TCI states.

Certain embodiments may provide one or more of the following technical advantage(s). Embodiments of the solutions described herein may enable more flexibility in updating the power control parameters associated with an UL TCI state for a UE when the UL TCI state is applicable to PUCCH, PUSCH, and SRS.

Figure 10:
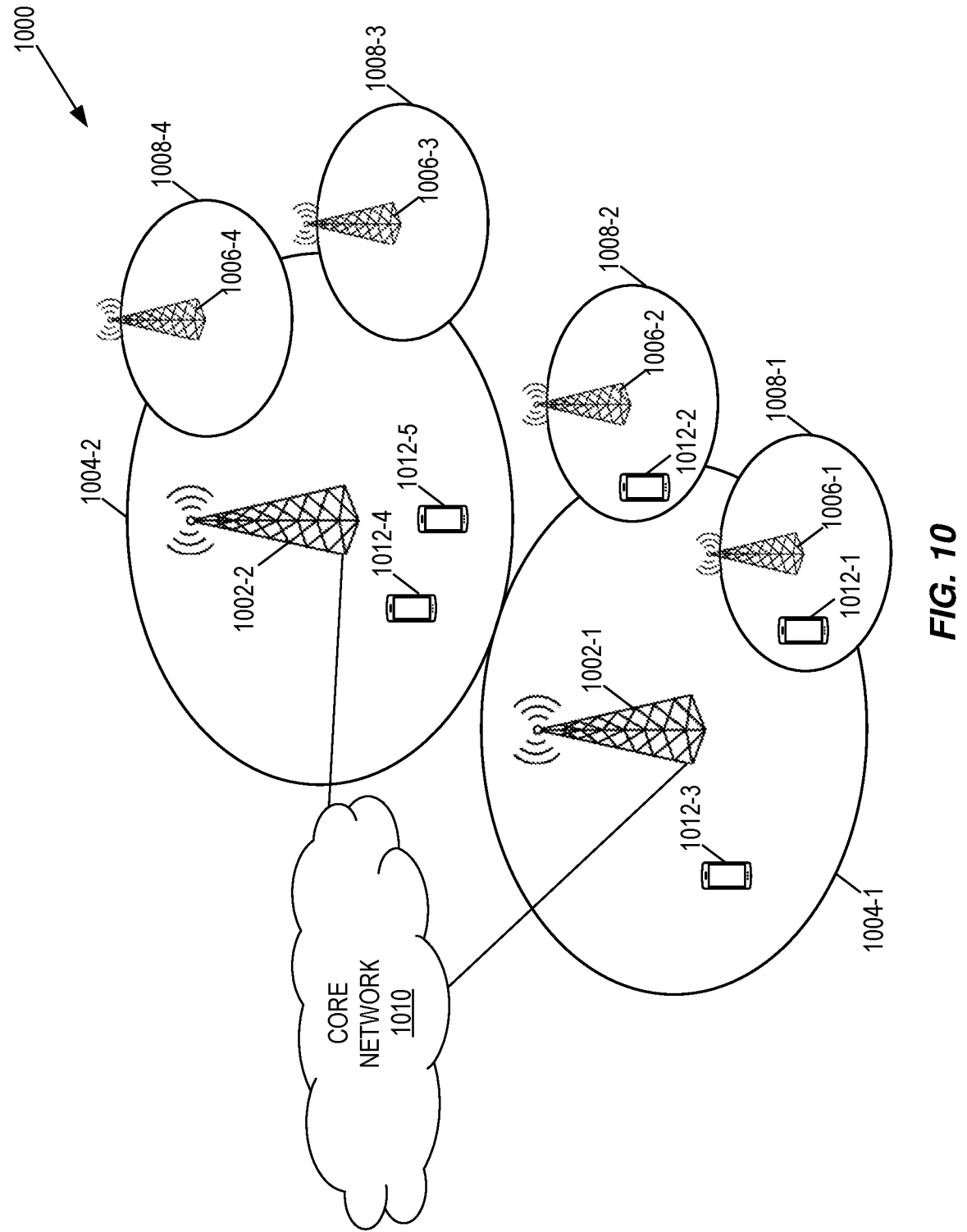
FIG. 10 illustrates one example of a cellular communications system, according to some embodiments of the present disclosure.

FIG. 10 illustrates one example of a cellular communications system 1000 in which embodiments of the present disclosure may be implemented. In the embodiments described herein, the cellular communications system 1000 is a 5G system (5GS) including a Next Generation RAN (NG-RAN) and a 5G Core (5GC); however, embodiments of the solutions disclosed herein are not limited thereto. In this example, the RAN includes base stations 1002-1 and 1002-2, which in the 5GS include gNBs and optionally next generation eNBs (ng-eNBs) (e.g., LTE RAN nodes connected to the 5GC), controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or RRHs, or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5GC. The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

The description below describes various embodiments of the solutions disclosed herein under separate headings. Note that while the headings are used to assist in understanding, it should also be understood that the embodiments described under different headings may be combined.

MAC CE for Updating Item X Associated with a "Power Control State"

In this embodiment, a MAC CE is used to update an item X in a "Power control state."

In this embodiment, a power control state contains one or more power control parameters, where the one or more power control parameters may include $P_O$, $\alpha$, a pathloss RS, and/or a closed loop index. Further, in order to update the value of a power control parameter, a separate list is defined for each of the one or more of the power control parameters, and each power control state includes, for each power control parameter in that power control state, a pointer to one value of that power control parameter in the respective list. An example of this is schematically illustrated in FIG. 11, where separate lists of values for $P_O$ and $\alpha$ are configured, and a pointer (i.e., P0 ID and $\alpha$ ID) to one value in each of these lists is defined per power control state. Note that while in the example of FIG. 13 only one value is shown in each of the list for $P_O$ and the list for $\alpha$, these lists may each include multiple values with associated IDs.

In another embodiment, in addition to traditional power control parameters, a list of TCI states is configured or associated to each power control state. As the power control state does not contain only information about power control parameters, it may alternatively be called "UL transmission state," as an example. An example is illustrated in FIG. 12.

In another embodiment, a MAC CE (or other signaling) is designed to update an item X in the power control state. The item X is a pair or a collection of two or more of $P_O$, $\alpha$, pathloss RS, closed loop index, TCI state/spatial relation ID. For example, the configuration of the power control state may include a list of pairs of pathloss reference RS and TCI state/spatial relations. In another example, one reference signal may be used for both pathloss reference and spatial reference. In a further example, there may be a list of triplets of pathloss reference RS, TCI state ID, and closed loop index. Other combinations are also possible. Each of these elements of the list becomes the item X and each has an ID. FIG. 13 illustrates an example where a list of a pair of $P_O$, $\alpha$ is configured, and a pointer to one pair in the list per power control state indicates which values to apply.

FIG. 14 illustrates an example of MAC CE for updating item X in the power control state. It should be noted that the exact MAC CE design depends on the ID spaces and may differ slightly from the examples provided herein. Further, the final MAC CE may have additional fields. The MAC CE may have a single pair of power control state ID and Item X ID, or multiple such pairs. The item X ID refers to a preconfigured value that indicates a particular item X. Item X may be the pointer (ID) for one of the power control parameters (e.g., one of $P_O$, $\alpha$, pathloss RS, closed loop index) included in the power control state, the pointer (ID) for the TCI state/spatial relation ID included in the power control state, or a group or pair formed of those. In the latter case, in one embodiment, one MAC CE can be used to update several pairs of items in the power control state. In this case, the UE knows from the length field how many pairs the MAC CE contains.

In another embodiment, the same MAC CE is used to update item X in more than one power control state. FIG. 15 depicts an example of a MAC CE for this embodiment. The UE knows from the length field how many power control states for which the MAC CE contains an update.

FIG. 24 illustrates the operation of a UE 1012 and a base station 1002 in accordance with at least some of the embodiments described above. Optional steps are represented by dashed lines/boxes. As illustrated, the UE 1012 receives an indication of one or more activate TCI states for a plurality of physical uplink channels or uplink reference signals via a first MAC CE message (step 2390). For each of the plurality of physical uplink channels or uplink reference signals, the UE 1012 receives one or more power control parameter lists each comprising a plurality of elements, where each element in the one or more power control parameter lists comprises one or more values for one or more respective power control parameters (step 2400). For each of the one or more activate TCI states and each of the plurality of physical uplink channels or uplink reference signals, the UE 1012 obtains power control state information via a second MAC CE message that maps a power control state. The power control state information comprises one or more indications. Each of the one or more indications indicates a particular element from among the plurality of elements in one of the one or more power control parameter lists such that the one or more values for the one or more respective power control parameters comprised in the particular element are indicated for the power control state (step 2402). The UE 1012 transmits each of the plurality of physical uplink channels or uplink reference signals according to the one or more active TCI states and the respective power control state information (step 2403).

The UE 1012 may also receive an update for the power control state(s), where the update comprises a new indication of a new particular element from among the plurality of elements in the first power control parameter list such that the one or more values for the one or more respective power control parameters comprised in the new particular element are indicated for the power control state (step 2404). In one embodiment, the update is received via a MAC CE. In one embodiment, the MAC CE comprises one or more additional updates to the power control state. In one embodiment, the update is to be applied to the power control state and one or more additional power control states indicted in the MAC CE.

In one embodiment, the plurality of elements in the first power control parameter list comprise a different value for a first power control parameter. The first indication comprised in the power control state information indicates the particular element from among the plurality of elements in the first power control parameter list such that the value for the first power control parameter comprised in the particular element of the first power control parameter list is indicated for the power control state. In one embodiment, the first power control parameter is $P_0$, $\alpha$, or a closed loop index.

In one embodiment, in step 2400, in addition to obtaining the first power control parameter list, the UE 1012 obtains a second power control parameter list comprising a plurality of elements, where each element in the second power control parameter list comprises a different value for a respective second power control parameter. Then, in step 2404, the power control state information that defines the power control state further comprises a second indication of a particular element from among the plurality of elements in the second power control parameter list such that the value for the second power control parameter comprised in the particular element of the second power control parameter list is indicated for the power control state. In one embodiment, the first power control parameter is one of $P_0$, $\alpha$, or a closed loop index, and the second power control parameter is a different one of $P_0$, $\alpha$, or the closed loop index.

In one embodiment, the power control state information further comprises a list of one or more TCI state identifiers associated to the power control state.

In another embodiment, each of the plurality of elements of the first power control parameter list comprises a different set of values for two or more power control parameters. In one embodiment, the two or more power control parameters comprise: $P_0$ and $\alpha$; $P_0$ and a closed loop index; $\alpha$ and a closed loop index; or $P_0$, $\alpha$, and a closed loop index.

In one embodiment, the UE 1012 uses the power control state information for one or more uplink transmissions (e.g., uses the associated power control parameter value(s) to determine UL power for an uplink transmission(s) and transmitting the uplink transmission(s) accordingly) (step 2406).

Note that while the description of the process of FIG. 24 above describes at least some aspects of the embodiments described in Section 2.1, it should be any aspects of the embodiments described in Section 2.1 above that are not described specifically in relation to FIG. 24 are also applicable.

Power Control Parameter Activation/Deactivation for Activated TCI States

In this embodiment, the UE is configured separately with power control states and TCI states. The TCI state may be UL TCI state, or a pair of UL and DL TCI states, or a common TCI state for both UL and DL. For simplicity, all of these are referred to herein as a TCI state.

Here, each activated (UL) TCI state in the uplink is associated with a power control state through a "TCI state to power control" mapping. A "TCI state to power control" mapping between an activated TCI state and a power control state can be configured per uplink channel (e.g., PUSCH, PUCCH, or SRS) or per UL resource/resource set (SRS resource/SRS resource set/PUCCH resource/PUCCH resource set)

Figures 16, 17:
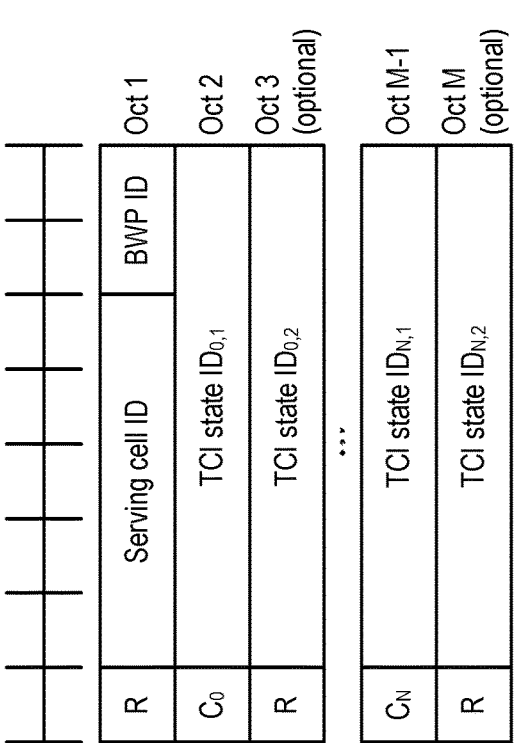
FIG. 16 illustrates an example of a TCI state activating a MAC CE, according to some embodiments of the present disclosure.
FIG. 17 illustrates an example where each of the power control parameters in a "TCI state to power control" mapping can be activated/updated by another MAC CE, according to some embodiments of the present disclosure.

For example, for the example of a TCI state activating MAC CE shown in FIG. 16, the corresponding "TCI state to power control" IDs are shown in Table 3 below, where TCI state $ID_{0,1}$ is mapped to "TCI state to power control" ID=0; TCI state $ID_{0,2}$ is mapped to "TCI state to power control" ID=1, and so on.

TABLE 3

Mapping between activated TCI states and "TCI state to power control" IDs

| Activated TCI state | "TCI state to power control" ID |
|---|---|
| TCI state $ID_{0,1}$ | 0 |
| TCI state $ID_{0,2}$ | 1 |
| . . . | . . . |
| TCI state $ID_{N,1}$ | M-1 |
| TCI state $ID_{N,2}$ | M-2 |

Each of the power control parameters in a "TCI state to power control" mapping can be activated/updated by another MAC CE. An example is shown in FIG. 17, where field "N" may be used to indicate the number of additional octets present and field "F" may be used to indicate one of a $P_O$ and $\alpha$ sets ID, a pathloss RS ID, and a closed-loop index. Field "R" is reserved and may have a variable bit length across the octets.

In another embodiment, the same MAC CE is used to update multiple "TCI state to power control" mappings as shown in FIG. 18, where two "TCI state to power control" mappings are updated. Field "C" may be used to indicate whether additional "TCI state to power control" mapping is present after the current octet.

The above MAC CE activation/updating is done for each uplink channel, i.e., PUSCH, PUCCH, SRS.

Although two different MAC CEs are assumed in this embodiment for updating the active TCI states (via the MAC CE in FIG. 16) and updating the power control parameters associated with the TCI state (via either the MAC CE in FIG. 17 or FIG. 18), this embodiment is non-limiting in the sense that a single MAC CE can perform both updating the TCI states and providing the power control parameters associated with each of the activated TCI state. In this case, in one embodiment, there is field in the MAC CE indicating if the MAC CE performs both of the said functions or one of them, and indicating which one of them.

In another embodiment, the associations between UL TCI states and power control states are done in each power control state, as schematically illustrated in FIG. 19. A separate power control state IE may be configured for each of the UL channels, i.e., PUCCH, PUSCH, and SRS. When a UL TCI state is indicated to a PUCCH, PUSCH, or SRS transmission, the TCI state is also used to identify a power control state with a set of power control parameters. So, a TCI state may appear in only one power control state for each UL channel.

In another embodiment, the association between a UL TCI state and a power control state for each UL channel may be done dynamically by a MAC CE when the TCI state is activated. In other words, when a TCI state is activated, its associated power control state ID is also indicated for each UL channel. An example is shown in FIG. 20, where a list of M power control states and N TCI states are configured semi-statically (e.g., by RRC) and N1 (N1<=N) TCI states are dynamically activated (e.g., by a MAC CE). For each of the N1 activated TCI states, it is associated with one power control state from the configured list of power control states for each UL channel.

When more than one SRS resource set are configured, each SRS resource set may be associated with a subset of the activated TCI states. An example is shown in FIG. 21, an SRS resource set is indicated for each activated TCI state. This may be done for each SRS "usage" type.

In yet another example, a power control state ID is associated with each UL channel/UL resource set for each UL TCI state, as illustrated in FIG. 22. In this example three TCI states are activated by MAC-CE, and the MAC-CE associates for each of the activated TCI states with one Power control state for each UL channel/SRS resource set. FIG. 22 thus illustrates an example in which the MAC-CE used to activate TCI states also indicates an association between each activated TCI state and one Power Control State for each UL channel/SRS resource set.

Figure 25:
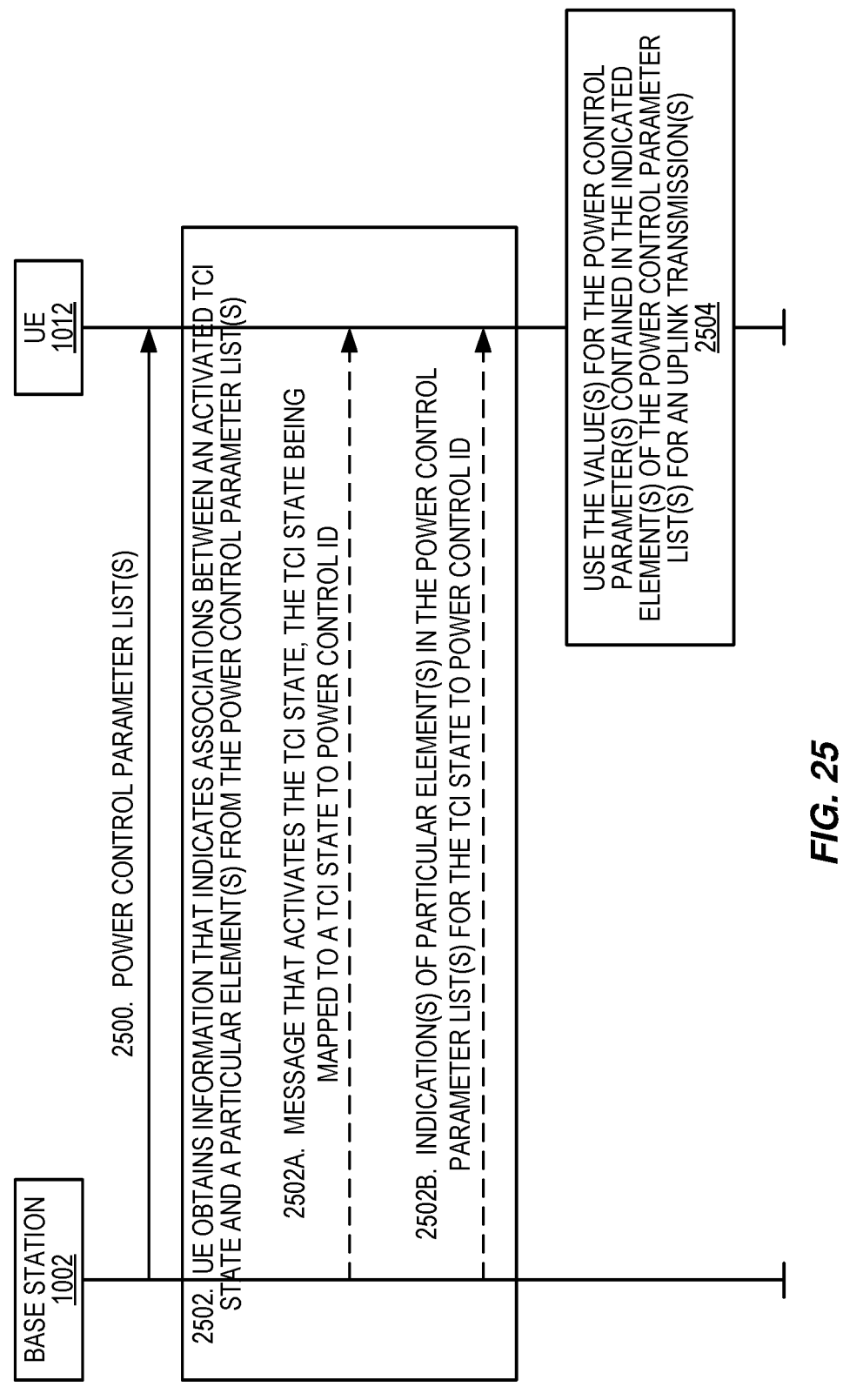
FIG. 25 illustrates another example of an operation of a base station and a UE according to some embodiments of the present disclosure.

FIG. 25 illustrates the operation of a UE 1012 and a base station 1002 in accordance with at least some of the embodiments described above. Optional steps are represented by dashed lines/boxes. As illustrated, the UE 1012 obtains one or more power control parameter lists, e.g., from the base station 1002 in this example (step 2500). More specifically, the power control parameter lists include a first power control parameter list comprising a plurality of elements, where each element in the first power control parameter list comprises one or more values for one or more respective power control parameters. The UE 1012 obtains information that indicates an association between an activated TCI state and a particular element(s) of the power control parameter list(s) (step 2502). The UE 1012 may use the value(s) for the respective power control parameter(s) in the particular element(s) of the power control parameter list(s) associated to the activated TCI state for an uplink transmission(s) associated to the activated TCI state (step 204).

In one embodiment, the UE 1012 receives the information in step 2502 by receiving a message that activates the TCI state, the TCI state being mapped to a respective TCI state to power control identifier (step 2502A), and receiving, for the TCI state to power control identifier, an indication(s) of the particular element(s) of the power control parameter list(s) such that the value(s) for the power control parameter(s) comprised in the particular element(s) of the power control parameter list(s) are indicated for the TCI state to power control ID and thus associated to the activated TCI state (step 2502B). In one embodiment, the indication(s) of the particular element(s) of the power control parameter list(s) for the TCI state to power control identifier are received in a MAC CE(s). In one embodiment, the message that activates the TCI state is a MAC CE, and the indication(s) are comprised in the MAC CE.

In one embodiment, the message that activates the TCI state is a MAC CE, and the information that indicates the association between the activated TCI state and the particular element(s) of the power control parameter list(s) is comprised in the MAC CE that activates the TCI state.

MAC CE for Updating Common or Different Power Control Parameters for PUSCH, PUCCH, and SRS In this embodiment, some power control parameters are defined in a common list (i.e., the list is common to PUSCH, PUCCH, and SRS), while some other power control param- eters are defined in lists that are only applicable to certain subset of channels or signals (e.g., the list may be applicable to PUSCH and SRS but not PUCCH). This embodiment is motivated by one or more of the following facts:

the TCI state may be unified and can be common to the different UL channels and signals (i.e., the same list of TCI states are applicable to PUSCH, PUCCH, and SRS), certain power control parameters such as pathloss RS ID and open loop power control parameter $P_O$ are appli- cable to PUSCH/PUCCH/SRS, certain other parameters such as a and the parameter tpc-Accumulation for disabling accumulation of TPC are only applicable to PUSCH/SRS and not applicable to PUCCH (note that for PUCCH absolute TPC is applied and accumulation is always disabled), and the closed loop for SRS may be shared with PUSCH while the closed loops for PUCCH may be separately defined.

Hence, in one embodiment, one common list of pathloss RS IDs may be configured that is applicable to PUSCH, PUCCH, and SRS. Similarly, one common list of open loop power control parameter $P_0$ may be configured that is applicable to PUSCH, PUCCH, and SRS.

In this embodiment, one list of the open loop power control parameter a may be configured that is common to PUSCH and SRS. This list is not applicable to PUCCH.

Since some power control parameters are common to all channels/signals while some other power control parameters are only applicable to some channels/signals, different flags may be included in the MAC CE that updates the power control parameters applicable to a TCI state to indicate that some parameters may be optionally present in the MAC CE. An example MAC CE is shown in FIG. 23 where one or more of the following flags may be included:

A bit or flag $F_{PL\_RS}$ that indicates if the pathloss RS ID is being updated for the corresponding 'TCI state to power control' ID indicated in the MAC CE. If this flag is set to '1', then the pathloss RS ID is being updated and the pathloss RS ID field is provided in the MAC CE. If this flag is set to '0', then the pathloss RS ID is not being updated and the pathloss RS ID field is not provided in the MAC CE.

A bit or flag $P_{P_0}$ that indicates if the $P_O$ set ID is being updated for the corresponding 'TCI state to power control' ID indicated in the MAC CE. If this flag is set to '1', then the $P_O$ set ID is being updated and the $P_O$ set ID field is provided in the MAC CE. If this flag is set to '0', then the $P_O$ set ID is not being updated and the $P_O$ set ID field is not provided in the MAC CE.

A bit or flag $F_\alpha$ that indicates if the $\alpha$ set ID is being updated for the corresponding 'TCI state to power control' ID indicated in the MAC CE. If this flag is set to '1', then the $\alpha$ set ID is being updated and the $\alpha$ set ID field is provided in the MAC CE. If this flag is set to '0', then the $\alpha$ set ID is not being updated and the $\alpha$ set ID field is not provided in the MAC CE.

A bit or flag $F_{CL\_index}$ that indicates if the closed-loop index is being updated for the corresponding 'TCI state to power control' ID indicated in the MAC CE. If this flag is set to '1', then the closed-loop index is being updated and the closed-loop index field is provided in the MAC CE. If this flag is set to '0', then the closed-loop index is not being updated and the closed-loop index field is not provided in the MAC CE. In some embodiments, the field $F_{CL\_index}$ may constitute additional bit(s) to indicate if the close-loop index is specific to PUSCH, SRS, or PUCCH. For example, one bit could indicate if the closed-loop index is specific to PUSCH/ SRS (e.g., when the bit is set to 0) or PUCCH (e.g., when the bit is set to 1). In some other embodiments, the flag for indicating if the closed-loop index is being updated can be a separate field in the MAC CE from the field that indicates if the closed-loop index is specific to PUSCH, SRS, or PUCCH.

A bit/flag $F_{accumulation}$ may indicate if TPC accumulation is enabled or disabled. If the flag is set to 1, then TPC accumulation is enabled. If the flag is set to 0, then TPC accumulation is disabled. Since TPC accumulation is not applicable for PUCCH, when a TCI state is applied to a PUCCH, the corresponding 'TCI state to power control' mapping is expected to have TPC accumulation disabled. Alternatively, the UE may assume that the TPC accumula- tion is disabled when a TCI state is applied to a PUCCH regardless of TPC accumulation flag set to the correspond- ing 'TCI state to power control' mapping.

Although the example in FIG. 23 shows power control parameters are updated to a single 'TCI state to power control' ID, the example is non-limiting in that the MAC CE can be easily extended to the case where power control parameters being updated to multiple 'TCI state to power control' IDs in the same MAC CE. In this case, a single set of flags similar to the ones present in FIG. 23 may be applicable to the multiple 'TCI state to power control' IDs for which power control parameters are being updated in the same MAC CE. Alternatively, each of the multiple 'TCI state to power control' IDs for which power control param- eters are being updated in the same MAC CE may contain dedicated flags similar to the ones present in FIG. 23.

Additional Description

Figure 26:
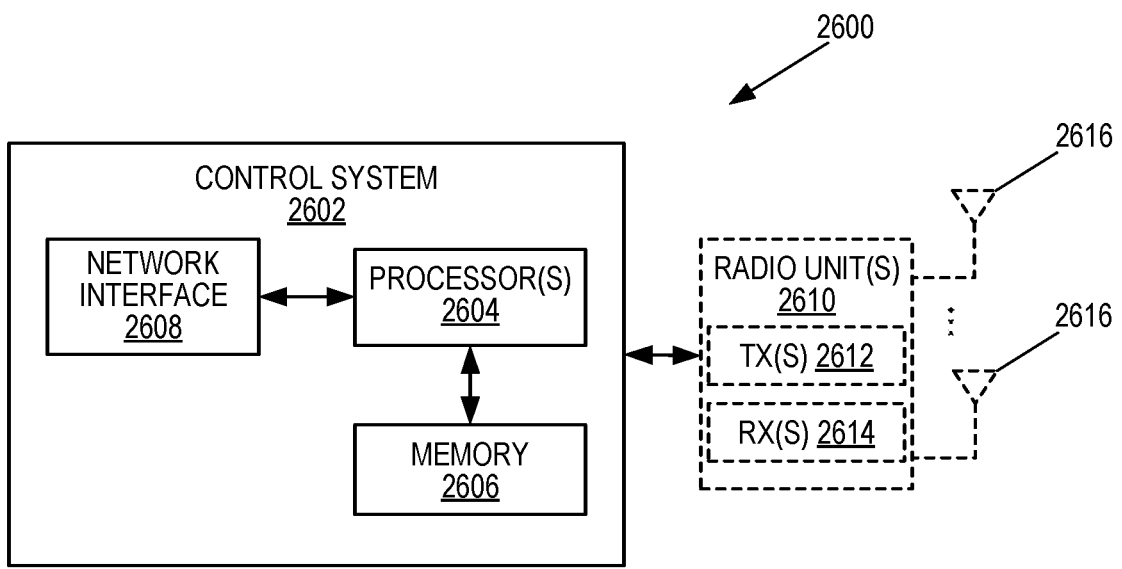
FIG. 26 is a schematic block diagram of a radio access node according to some embodiments of the present disclosure.

FIG. 26 is a schematic block diagram of a radio access node 2600 according to some embodiments of the present disclosure. Optional features are represented by dashed boxes. The radio access node 2600 may be, for example, a base station 1002 or 1006 or a network node that implements all or part of the functionality of the base station 1002 or gNB described herein. As illustrated, the radio access node 2600 includes a control system 2602 that includes one or more processors 2604 (e.g., Central Processing Units (CPUs), Application Specific Integrated Circuits (ASICs), Field Programmable Gate Arrays (FPGAs), and/or the like), memory 2606, and a network interface 2608. The one or more processors 2604 are also referred to herein as process- ing circuitry. In addition, the radio access node 2600 may include one or more radio units 2610 that each includes one or more transmitters 2612 and one or more receivers 2614 coupled to one or more antennas 2616. The radio units 2610 may be referred to or be part of radio interface circuitry. In some embodiments, the radio unit(s) 2610 is external to the control system 2602 and connected to the control system 2602 via, e.g., a wired connection (e.g., an optical cable). However, in some other embodiments, the radio unit(s) 2610 and potentially the antenna(s) 2616 are integrated together with the control system 2602. The one or more processors 2604 operate to provide one or more functions of a radio access node 2600 as described herein. In some embodi- ments, the function(s) are implemented in software that is stored, e.g., in the memory 2606 and executed by the one or more processors 2604.

Figure 27:
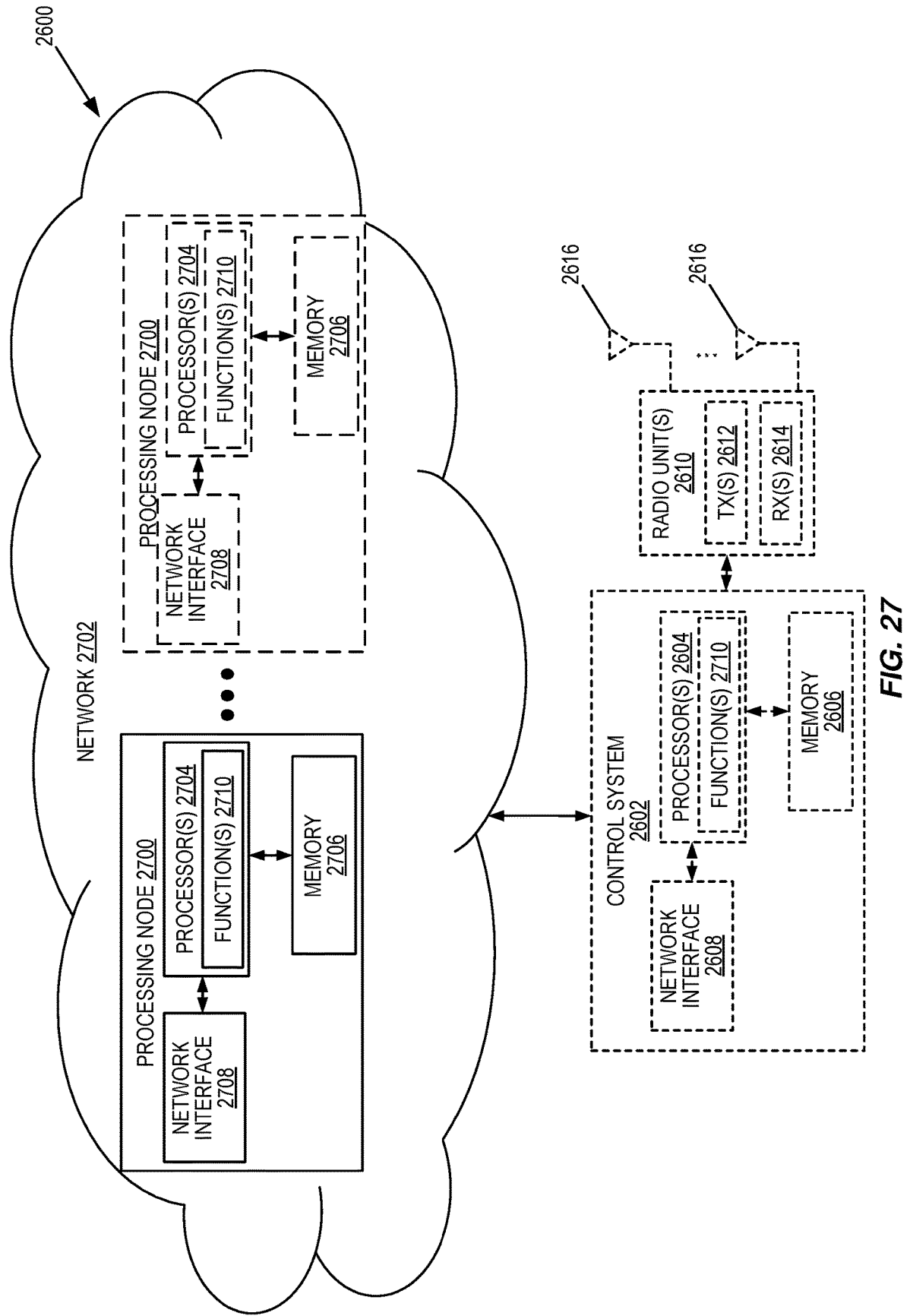
FIG. 27 is a schematic block diagram that illustrates a virtualized embodiment of the radio access node according to some embodiments of the present disclosure.

FIG. 27 is a schematic block diagram that illustrates a virtualized embodiment of the radio access node 2600 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 2600 in which at least a portion of the functionality of the radio access node 2600 is implemented as a virtual component(s) (e.g., via a virtual machine(s) executing on a physical processing node(s) in a network(s)). As illustrated, in this example, the radio access node 2600 may include the control system 2602 and/or the one or more radio units 2610, as described above. The control system 2602 may be connected to the radio unit(s) 2610 via, for example, an optical cable or the like. The radio access node 2600 includes one or more processing nodes 2700 coupled to or included as part of a network(s) 2702. If present, the control system 2602 or the radio unit(s) are connected to the processing node(s) 2700 via the network 2702. Each processing node 2700 includes one or more processors 2704 (e.g., CPUs, ASICs, FPGAs, and/or the like), memory 2706, and a network interface 2708.

In this example, functions 2710 of the radio access node 2600 described herein are implemented at the one or more processing nodes 2700 or distributed across the one or more processing nodes 2700 and the control system 2602 and/or the radio unit(s) 2610 in any desired manner. In some particular embodiments, some or all of the functions 2710 of the radio access node 2600 described herein are implemented as virtual components executed by one or more virtual machines implemented in a virtual environment(s) hosted by the processing node(s) 2700. As will be appreciated by one of ordinary skill in the art, additional signaling or communication between the processing node(s) 2700 and the control system 2602 is used in order to carry out at least some of the desired functions 2710. Notably, in some embodiments, the control system 2602 may not be included, in which case the radio unit(s) 2610 communicate directly with the processing node(s) 2700 via an appropriate network interface(s).

In some embodiments, a computer program including instructions which, when executed by at least one processor, causes the at least one processor to carry out the functionality of radio access node 2600 or a node (e.g., a processing node 2700) implementing one or more of the functions 2710 of the radio access node 2600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 28:
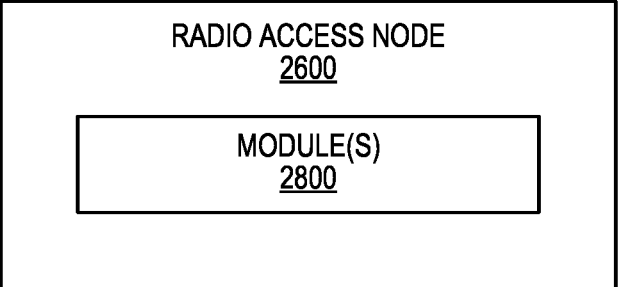
FIG. 28 is a schematic block diagram of the radio access node according to some other embodiments of the present disclosure.

FIG. 28 is a schematic block diagram of the radio access node 2600 according to some other embodiments of the present disclosure. The radio access node 2600 includes one or more modules 2800, each of which is implemented in software. The module(s) 2800 provide the functionality of the radio access node 2600 described herein. This discussion is equally applicable to the processing node 2700 of FIG. 27 where the modules 2800 may be implemented at one of the processing nodes 2700 or distributed across multiple processing nodes 2700 and/or distributed across the processing node(s) 2700 and the control system 2602.

Figure 29:
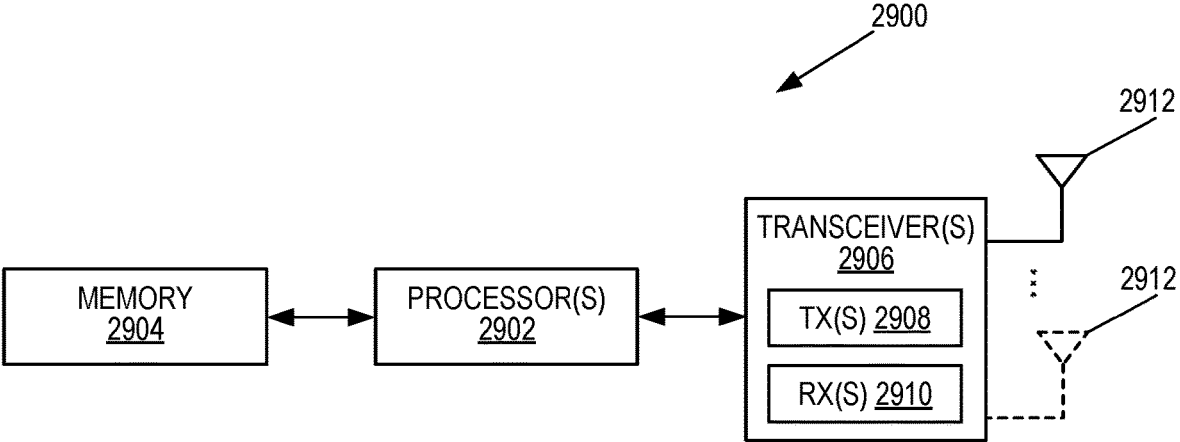
FIG. 29 is a schematic block diagram of a wireless communication device according to some embodiments of the present disclosure.

FIG. 29 is a schematic block diagram of a wireless communication device 2900 according to some embodiments of the present disclosure. The wireless communication device 2900 may be a UE 1012. As illustrated, the wireless communication device 2900 includes one or more processors 2902 (e.g., CPUs, ASICs, FPGAs, and/or the like), memory 2904, and one or more transceivers 2906 each including one or more transmitters 2908 and one or more receivers 2910 coupled to one or more antennas 2912. The transceiver(s) 2906 includes radio-front end circuitry connected to the antenna(s) 2912 that is configured to condition signals communicated between the antenna(s) 2912 and the processor(s) 2902, as will be appreciated by on of ordinary skill in the art. The processors 2902 are also referred to herein as processing circuitry. The transceivers 2906 are also referred to herein as radio circuitry. In some embodiments, the functionality of the wireless communication device 2900 described above (e.g., the functionality of a UE such as UE 1012 described above) may be fully or partially implemented in software that is, e.g., stored in the memory 2904 and executed by the processor(s) 2902. Note that the wireless communication device 2900 may include additional components not illustrated in FIG. 29 such as, e.g., one or more user interface components (e.g., an input/output interface including a display, buttons, a touch screen, a microphone, a speaker(s), and/or the like and/or any other components for allowing input of information into the wireless communication device 2900 and/or allowing output of information from the wireless communication device 2900), a power supply (e.g., a battery and associated power circuitry), etc.

In some embodiments, a computer program including instructions which, when executed by at least one processor, causes the at least one processor to carry out the functionality of the wireless communication device 2900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 30:
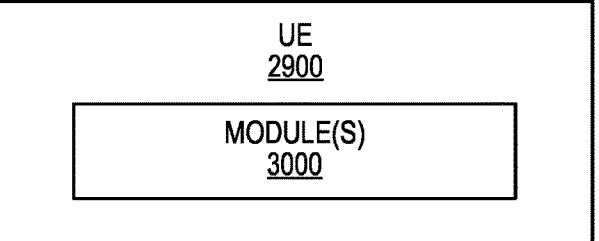
FIG. 30 is a schematic block diagram of the wireless communication device according to some other embodiments of the present disclosure.

FIG. 30 is a schematic block diagram of the wireless communication device 2900 according to some other embodiments of the present disclosure. The wireless communication device 2900 includes one or more modules 3000, each of which is implemented in software. The module(s) 3000 provide the functionality of the wireless communication device 2900 described herein (e.g., the functionality of a UE such as UE 1012 described above).

Figure 31:
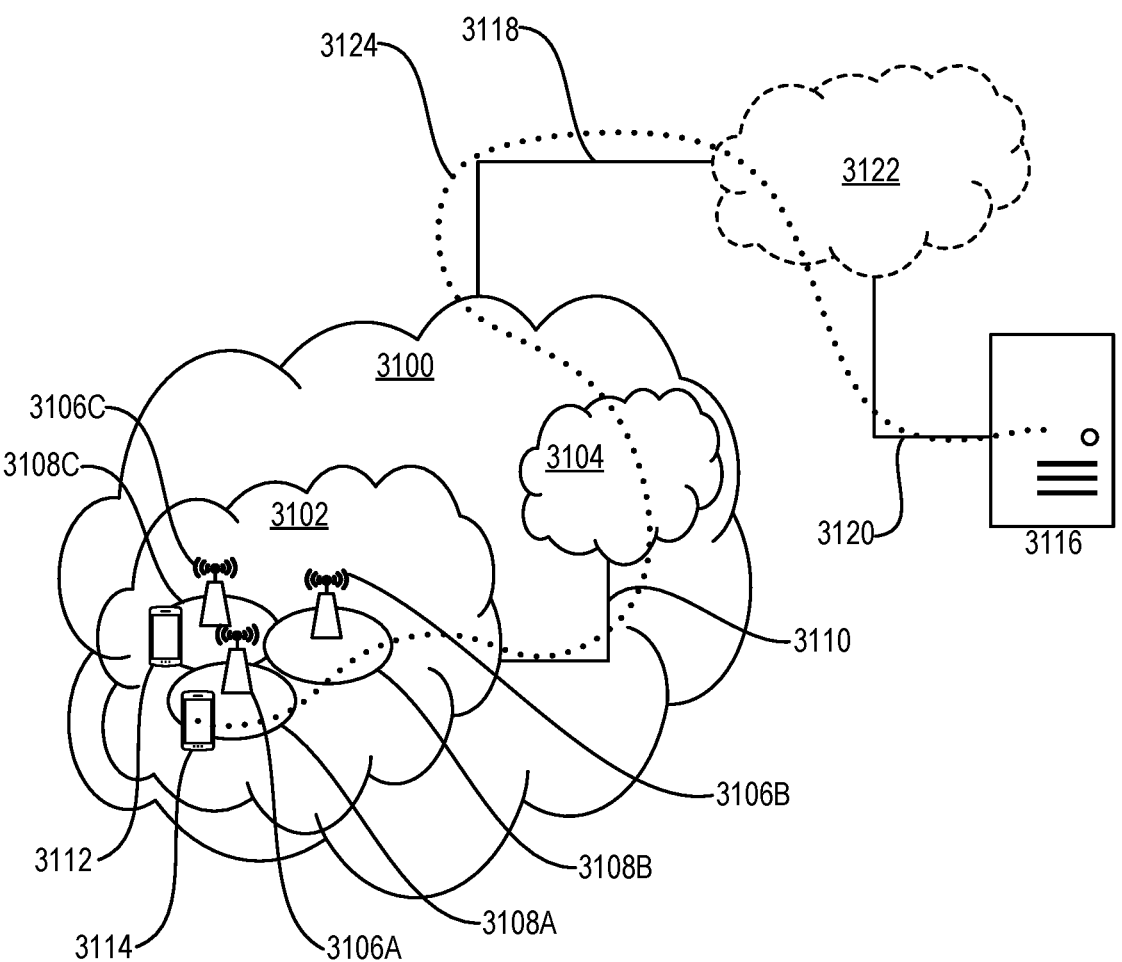
FIG. 31 a communication system includes a telecommunication network, such as a Third Generation Partnership Project (3GPP) type cellular network, which comprises an access network, such as a Radio Access Network (RAN), and a core network according to some embodiments of the present disclosure.

With reference to FIG. 31, in accordance with an embodiment, a communication system includes a telecommunication network 3100, such as a 3GPP-type cellular network, which comprises an access network 3102, such as a RAN, and a core network 3104. The access network 3102 comprises a plurality of base stations 3106A, 3106B, 3106C, such as Node Bs, eNBs, gNBs, or other types of wireless Access Points (APs), each defining a corresponding coverage area 3108A, 3108B, 3108C. Each base station 3106A, 3106B, 3106C is connectable to the core network 3104 over a wired or wireless connection 3110. A first UE 3112 located in coverage area 3108C is configured to wirelessly connect to, or be paged by, the corresponding base station 3106C. A second UE 3114 in coverage area 3108A is wirelessly connectable to the corresponding base station 3106A. While a plurality of UEs 3112, 3114 are illustrated in this example, the disclosed embodiments are equally applicable to a situation where a sole UE is in the coverage area or where a sole UE is connecting to the corresponding base station 3106.

The telecommunication network 3100 is itself connected to a host computer 3116, which may be embodied in the hardware and/or software of a standalone server, a cloud-implemented server, a distributed server, or as processing resources in a server farm. The host computer 3116 may be under the ownership or control of a service provider, or may be operated by the service provider or on behalf of the service provider. Connections 3118 and 3120 between the telecommunication network 3100 and the host computer 3116 may extend directly from the core network 3104 to the host computer 3116 or may go via an optional intermediate network 3122. The intermediate network 3122 may be one of, or a combination of more than one of, a public, private, or hosted network; the intermediate network 3122, if any, may be a backbone network or the Internet; in particular, the intermediate network 3122 may comprise two or more sub-networks (not shown).

The communication system of FIG. 31 as a whole enables connectivity between the connected UEs 3112, 3114 and the host computer 3116. The connectivity may be described as an Over-the-Top (OTT) connection 3124. The host computer 3116 and the connected UEs 3112, 3114 are configured to communicate data and/or signaling via the OTT connection 3124, using the access network 3102, the core network 3104, any intermediate network 3122, and possible further infrastructure (not shown) as intermediaries. The OTT connection 3124 may be transparent in the sense that the participating communication devices through which the OTT connection 3124 passes are unaware of routing of uplink and downlink communications. For example, the base station 3106 may not or need not be informed about the past routing of an incoming downlink communication with data originating from the host computer 3116 to be forwarded (e.g., handed over) to a connected UE 3112. Similarly, the base station 3106 need not be aware of the future routing of an outgoing uplink communication originating from the UE 3112 towards the host computer 3116.

Example implementations, in accordance with an embodiment, of the UE, base station, and host computer discussed in the preceding paragraphs will now be described with reference to FIG. 32. In a communication system 3200, a host computer 3202 comprises hardware 3204 including a communication interface 3206 configured to set up and maintain a wired or wireless connection with an interface of a different communication device of the communication system 3200. The host computer 3202 further comprises processing circuitry 3208, which may have storage and/or processing capabilities. In particular, the processing circuitry 3208 may comprise one or more programmable processors, ASICs, FPGAs, or combinations of these (not shown) adapted to execute instructions. The host computer 3202 further comprises software 3210, which is stored in or accessible by the host computer 3202 and executable by the processing circuitry 3208. The software 3210 includes a host application 3212. The host application 3212 may be operable to provide a service to a remote user, such as a UE 3214 connecting via an OTT connection 3216 terminating at the UE 3214 and the host computer 3202. In providing the service to the remote user, the host application 3212 may provide user data which is transmitted using the OTT connection 3216.

The communication system 3200 further includes a base station 3218 provided in a telecommunication system and comprising hardware 3220 enabling it to communicate with the host computer 3202 and with the UE 3214. The hardware 3220 may include a communication interface 3222 for setting up and maintaining a wired or wireless connection with an interface of a different communication device of the communication system 3200, as well as a radio interface 3224 for setting up and maintaining at least a wireless connection 3226 with the UE 3214 located in a coverage area (not shown in FIG. 32) served by the base station 3218. The communication interface 3222 may be configured to facilitate a connection 3228 to the host computer 3202. The connection 3228 may be direct or it may pass through a core network (not shown in FIG. 32) of the telecommunication system and/or through one or more intermediate networks outside the telecommunication system. In the embodiment shown, the hardware 3220 of the base station 3218 further includes processing circuitry 3230, which may comprise one or more programmable processors, ASICs, FPGAs, or combinations of these (not shown) adapted to execute instructions. The base station 3218 further has software 3232 stored internally or accessible via an external connection.

The communication system 3200 further includes the UE 3214 already referred to. The UE's 3214 hardware 3234 may include a radio interface 3236 configured to set up and maintain a wireless connection 3226 with a base station serving a coverage area in which the UE 3214 is currently located. The hardware 3234 of the UE 3214 further includes processing circuitry 3238, which may comprise one or more programmable processors, ASICs, FPGAs, or combinations of these (not shown) adapted to execute instructions. The UE 3214 further comprises software 3240, which is stored in or accessible by the UE 3214 and executable by the processing circuitry 3238. The software 3240 includes a client application 3242. The client application 3242 may be operable to provide a service to a human or non-human user via the UE 3214, with the support of the host computer 3202. In the host computer 3202, the executing host application 3212 may communicate with the executing client application 3242 via the OTT connection 3216 terminating at the UE 3214 and the host computer 3202. In providing the service to the user, the client application 3242 may receive request data from the host application 3212 and provide user data in response to the request data. The OTT connection 3216 may transfer both the request data and the user data. The client application 3242 may interact with the user to generate the user data that it provides.

Figure 32:
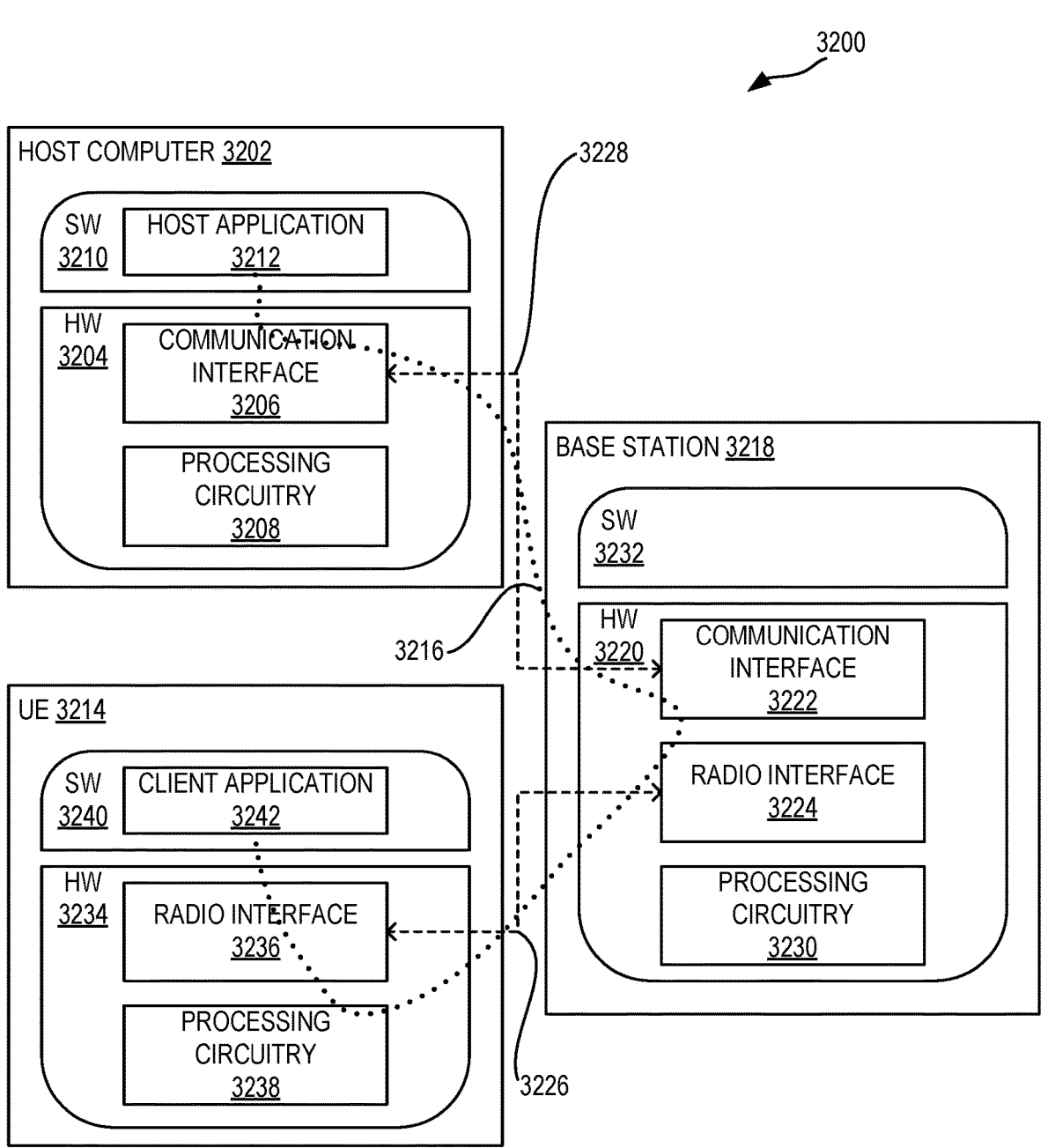
FIG. 32 illustrates a communication system including a host computer according to some embodiments of the present disclosure.

It is noted that the host computer 3202, the base station 3218, and the UE 3214 illustrated in FIG. 32 may be similar or identical to the host computer 3116, one of the base stations 3106A, 3106B, 3106C, and one of the UEs 3112, 3114 of FIG. 31, respectively. This is to say, the inner workings of these entities may be as shown in FIG. 32 and independently, the surrounding network topology may be that of FIG. 31.

In FIG. 32, the OTT connection 3216 has been drawn abstractly to illustrate the communication between the host computer 3202 and the UE 3214 via the base station 3218 without explicit reference to any intermediary devices and the precise routing of messages via these devices. The network infrastructure may determine the routing, which may be configured to hide from the UE 3214 or from the service provider operating the host computer 3202, or both. While the OTT connection 3216 is active, the network infrastructure may further take decisions by which it dynamically changes the routing (e.g., on the basis of load balancing consideration or reconfiguration of the network).

A measurement procedure may be provided for the purpose of monitoring data rate, latency, and other factors on which the one or more embodiments improve. There may further be an optional network functionality for reconfiguring the OTT connection 3216 between the host computer 3202 and the UE 3214, in response to variations in the measurement results. The measurement procedure and/or the network functionality for reconfiguring the OTT connection 3216 may be implemented in the software 3210 and the hardware 3204 of the host computer 3202 or in the software 3240 and the hardware 3234 of the UE 3214, or both. In some embodiments, sensors (not shown) may be deployed in or in association with communication devices through which the OTT connection 3216 passes; the sensors may participate in the measurement procedure by supplying values of the monitored quantities exemplified above, or supplying values of other physical quantities from which the software 3210, 3240 may compute or estimate the monitored quantities. The reconfiguring of the OTT connection 3216 may include message format, retransmission settings, preferred routing, etc.; the reconfiguring need not affect the base station 3218, and it may be unknown or imperceptible to the base station 3218. Such procedures and functionalities may be known and practiced in the art. In certain embodiments, measurements may involve proprietary UE signaling facilitating the host computer 3202's measurements of throughput, propagation times, latency, and the like. The measurements may be implemented in that the software 3210 and 3240 causes messages to be transmitted, in particular empty or 'dummy' messages, using the OTT connection 3216 while it monitors propagation times, errors, etc.

Figures 33, 34:
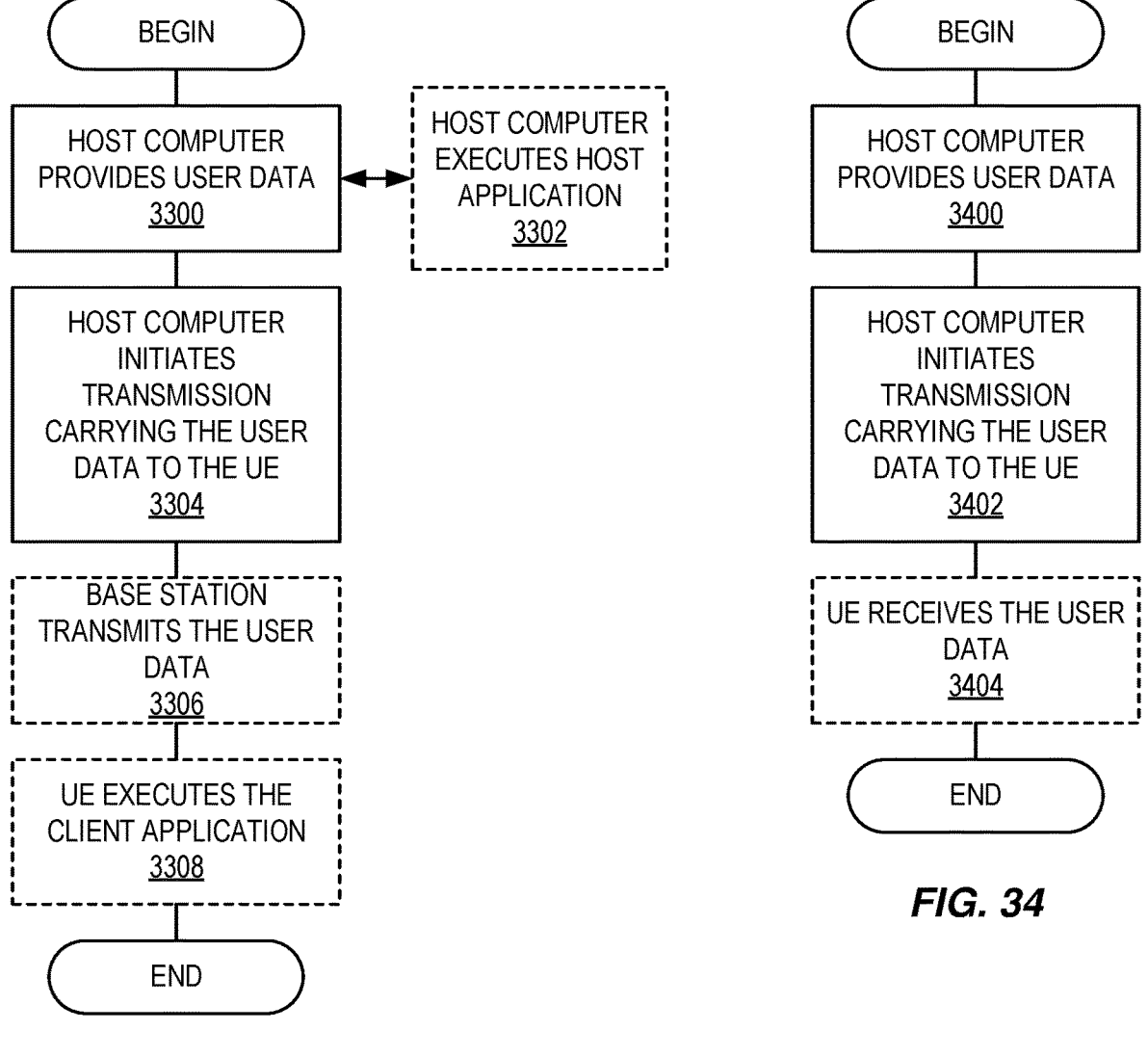
FIGS. 33-36 are flowcharts illustrating methods implemented in a communication system, according to some embodiments of the present disclosure.

FIG. 33 is a flowchart illustrating a method implemented in a communication system, in accordance with one embodiment. The communication system includes a host computer, a base station, and a UE which may be those described with reference to FIGS. 31 and 32. For simplicity of the present disclosure, only drawing references to FIG. 33 will be included in this section. In step 3300, the host computer provides user data. In sub-step 3302 (which may be optional) of step 3300, the host computer provides the user data by executing a host application. In step 3304, the host computer initiates a transmission carrying the user data to the UE. In step 3306 (which may be optional), the base station transmits to the UE the user data which was carried in the transmission that the host computer initiated, in accordance with the teachings of the embodiments described throughout this disclosure. In step 3308 (which may also be optional), the UE executes a client application associated with the host application executed by the host computer.

FIG. 34 is a flowchart illustrating a method implemented in a communication system, in accordance with one embodiment. The communication system includes a host computer, a base station, and a UE which may be those described with reference to FIGS. 31 and 32. For simplicity of the present disclosure, only drawing references to FIG. 34 will be included in this section. In step 3400 of the method, the host computer provides user data. In an optional sub-step (not shown) the host computer provides the user data by executing a host application. In step 3402, the host computer initiates a transmission carrying the user data to the UE. The transmission may pass via the base station, in accordance with the teachings of the embodiments described throughout this disclosure. In step 3404 (which may be optional), the UE receives the user data carried in the transmission.

Figures 35, 36:
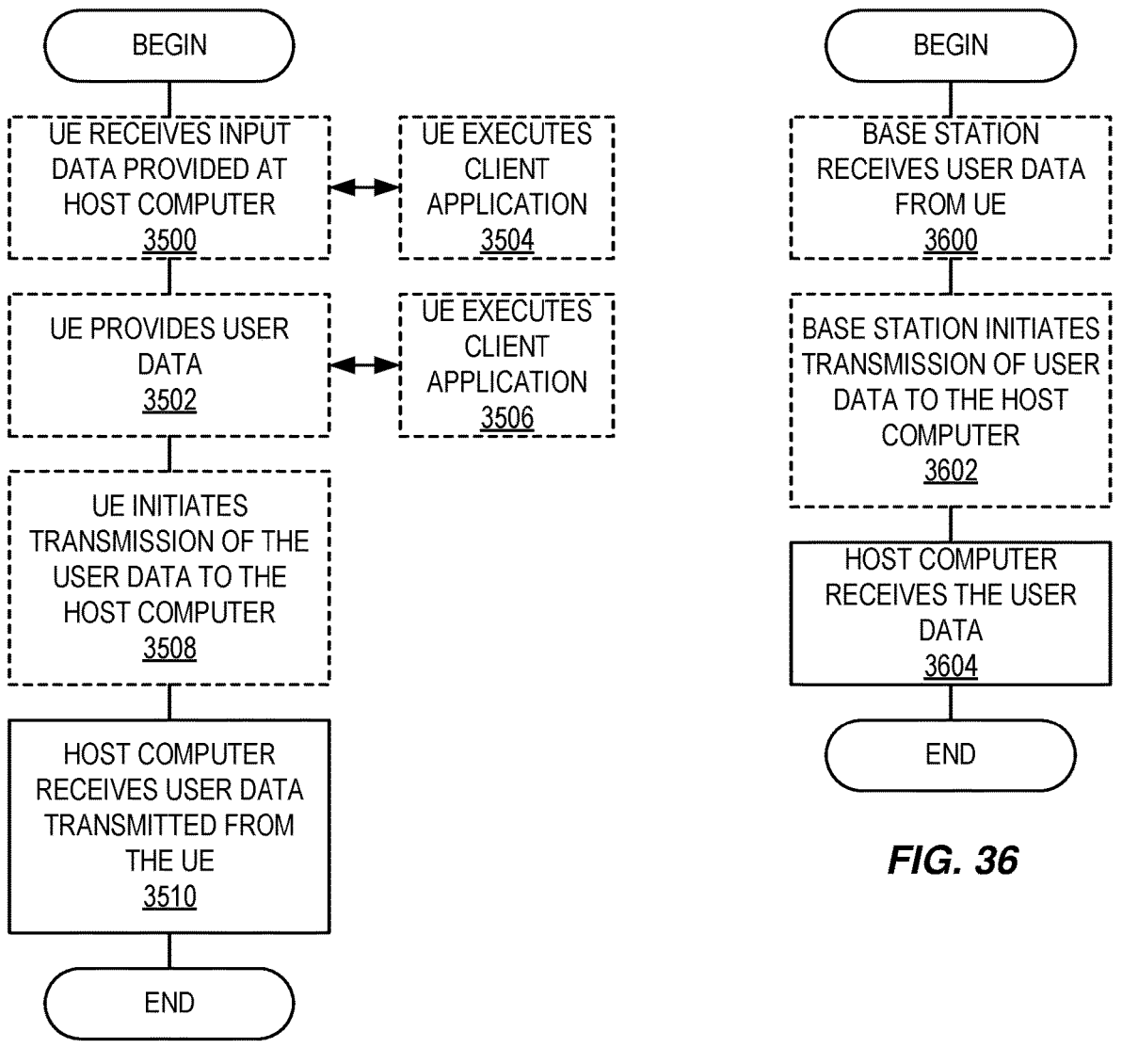

FIG. 35 is a flowchart illustrating a method implemented in a communication system, in accordance with one embodiment. The communication system includes a host computer, a base station, and a UE which may be those described with reference to FIGS. 31 and 32. For simplicity of the present disclosure, only drawing references to FIG. 35 will be included in this section. In step 3500 (which may be optional), the UE receives input data provided by the host computer. Additionally or alternatively, in step 3502, the UE provides user data. In sub-step 3504 (which may be optional) of step 3500, the UE provides the user data by executing a client application. In sub-step 3506 (which may be optional) of step 3502, the UE executes a client application which provides the user data in reaction to the received input data provided by the host computer. In providing the user data, the executed client application may further consider user input received from the user. Regardless of the specific manner in which the user data was provided, the UE initiates, in sub-step 3508 (which may be optional), transmission of the user data to the host computer. In step 3510 of the method, the host computer receives the user data transmitted from the UE, in accordance with the teachings of the embodiments described throughout this disclosure.

FIG. 36 is a flowchart illustrating a method implemented in a communication system, in accordance with one embodiment. The communication system includes a host computer, a base station, and a UE which may be those described with reference to FIGS. 31 and 32. For simplicity of the present disclosure, only drawing references to FIG. 36 will be included in this section. In step 3600 (which may be optional), in accordance with the teachings of the embodiments described throughout this disclosure, the base station receives user data from the UE. In step 3602 (which may be optional), the base station initiates transmission of the received user data to the host computer. In step 3604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function

US 12,628,086 B2

33

AN Access Network
AP Access Point
ASIC Application Specific Integrated Circuit
AUSF Authentication Server Function
BWP Bandwidth Part
CP-OFDM Cyclic Prefix Orthogonal Frequency Division
   Multiplexing
CPU Central Processing Unit
CSI-RS Channel State Information Reference Signal
DCI Downlink Control Information
DFT Discrete Fourier Transform
DL Downlink
DN Data Network
DSP Digital Signal Processor
eNB Enhanced or Evolved Node B
E-UTRA Evolved Universal Terrestrial Radio Access
FPGA Field Programmable Gate Array
FR Frequency Range
gNB New Radio Base Station
gNB-DU New Radio Base Station Distributed Unit
HARQ Hybrid Automatic Repeat Request
HSS Home Subscriber Server
IE information element
IoT Internet of Things
IP Internet Protocol
LTE Long Term Evolution
MAC CE Medium Access Control Element
MCS Modulation and Coding Scheme
MME Mobility Management Entity
MTC Machine Type Communication
NEF Network Exposure Function
NF Network Function
NR New Radio
NRF Network Function Repository Function
NSSF Network Slice Selection Function
OFDM Orthogonal Frequency Division Multiplexing
OTT Over-the-Top
PBCH Physical Broadcast Channel
PC Personal Computer
PCF Policy Control Function
PDCCH Physical Downlink Control Channel
PDSCH Physical Downlink Shared Channel
P-GW Packet Data Network Gateway
PRS Positioning Reference Signal
PUCCH Physical Uplink Control Channel
PUSCH Physical Uplink Shared Channel
QoS Quality of Service
RAM Random Access Memory
RAN Radio Access Network
RBs Resource Blocks
RE Resource Element
RF Radio Frequency
ROM Read Only Memory
RP Reception Point
RRC Radio Resource Control
RRH Remote Radio Head
RS Reference Signal
RTT Round Trip Time
SCEF Service Capability Exposure Function
SMF Session Management Function
SPS Semi-Persistently Scheduled
SRI SRS resource indicator
SRS Sounding Reference Signal
SS Synchronization Signal
SSB Synchronization Signal Block
TCI Transmission Configuration Indicator
TP Transmission Point

34

TPC Transmit Power Control
TRP Transmission/Reception Point
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device, comprising:
   receiving an indication of one or more activate Transmission Configuration Indicator, TCI, states for a plurality of physical uplink channels or uplink reference signals via a first Medium Access Control, MAC, Control Element, CE, message;
   receiving, for each of the plurality of physical uplink channels or uplink reference signals, one or more power control parameter lists each comprising a plurality of elements, where each element in the one or more power control parameter lists comprises one or more values for one or more respective power control parameters;
   obtaining, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state; and
   transmitting each of the plurality of physical uplink channels or uplink reference signals according to the one or more active TCI states and the respective power control state information;
   wherein each of the plurality of elements of the one or more power control parameter lists comprises a set of values for two or more power control parameters.

2. The method of claim 1, wherein receiving an indication of one or more active TCI states comprises receiving an indication in a Downlink Control Information, DCI, format in addition to the first MAC CE message.

3. The method of claim 2, wherein the update of a power control parameter is to be applied to the power control state and one or more additional power control states indicted in the third MAC CE message.

4. The method of claim 1, wherein the plurality of physical uplink channels can be two or more of a Physical Uplink Shared Channel, PUSCH, a Physical Uplink Control Channel, PUCCH; and the plurality of uplink reference signals can be two or more of a Sounding Reference Signal, SRS.

5. The method of claim 1, wherein receiving one or more power control parameter lists comprises receiving the one or more power control parameter lists via Radio Resource Control, RRC, signaling.

6. The method of claim 1, wherein the first MAC CE message and the second MAC CE message are separate control messages.

7. The method of claim 1, wherein the first MAC CE message and the second MAC CE message are the same control message.

8. The method of claim 1 further comprising receiving an update via a third MAC CE message for the power control state, the update comprising one or more new indications each indicating a new particular element from among the plurality of elements in one of the one or more power control parameter lists such that the one or more values for the one or more respective power control parameters comprised in the new particular element are used to replace the existing one or more values for the one or more respective power control parameters in the power control state.

9. The method of claim 1, wherein the third MAC CE message is the same as the second MAC CE message.

10. The method of claim 1 wherein the plurality of elements in each of the one or more power control parameter lists comprise different values for the one or more respective power control parameters.

11. The method of claim 1 wherein the one or more power control parameters comprise one or more of $P_0$, $\alpha$, a closed loop index, and a pathloss Reference Signal, RS.

12. The method of claim 1 wherein the method further comprises receiving, for each of the plurality of physical uplink channels or uplink reference signals, a mapping between one of the one or more active TCI states and one of a plurality of power control states for the respective physical uplink channel or uplink reference signal.

13. The method of claim 1 wherein the power control state information further comprises a list of one or more active TCI state identifiers associated to the power control state.

14. The method of claim 1 wherein the two or more power control parameters comprise:

$P_0$ and $\alpha$;

$P_0$ and a closed loop index;

$\alpha$ and a closed loop index; or $P_0$, $\alpha$, and a closed loop index.

15. A wireless communication device comprising:

one or more transmitters;

one or more receivers; and processing circuitry associated with the one or more transmitters and the one or more receivers, the processing circuitry configured to cause the wireless communication device to:

receive an indication of one or more activate Transmission Configuration Indicator, TCI, states for a plurality of physical uplink channels or uplink reference signals via a first Medium Access Control, MAC, Control Element, CE, message;

receive, for each of the plurality of physical uplink channels or uplink reference signals, one or more power control parameter lists each comprising a plurality of elements, where each element in the one or more power control parameter lists comprises one or more values for one or more respective power control parameters;

obtain, for each of the one or more activate TCI states and each of the plurality of physical uplink channels or uplink reference signals, power control state information via a second MAC CE message that maps a power control state, the power control state information comprising one or more indications each indicating a particular element from among the plurality of elements in one of the one or more power control parameter lists such that the one or more values for the one or more respective power control parameters comprised in the particular element are indicated for the power control state; and transmit each of the plurality of physical uplink channels or uplink reference signals according to the one or more active TCI states and the respective power control state information;

wherein each of the plurality of elements of the one or more power control parameter lists comprises a set of values for two or more power control parameters.

16. A method performed by a wireless communication device, comprising:

obtaining a first power control parameter list comprising a plurality of elements, where each element in the first power control parameter list comprises one or more values for one or more respective power control parameters; and receiving information that indicates an association between an activated Transmission Configuration Indicator, TCI, state and a particular element from among the plurality of elements in the first power control parameter list;

wherein each of the plurality of elements of the one or more power control parameter lists comprises a set of values for two or more power control parameters.

17. The method of claim 16 further comprising using the one or more values for the one or more respective power control parameters in the particular element of the first power control parameter list for an uplink transmission associated to the activated TCI state.

18. The method of claim 16 wherein receiving the information that indicates the association between the activated TCI state and the particular element from among the plurality of elements in the first power control parameter lists comprises:

receiving a message that activates the TCI state, the TCI state being mapped to a respective TCI state to power control identifier; and receiving, for the TCI state to power control identifier, an indication of the particular element from among the plurality of elements in the first power control parameter list such that the one or more values for the one or more respective power control parameters comprised in the particular element of the first power control parameter list are indicated for the TCI state to power control ID and thus associated to the activated TCI state.

19. A wireless communication device comprising:

one or more transmitters;

one or more receivers; and processing circuitry associated with the one or more transmitters and the one or more receivers, the processing circuitry configured to cause the wireless communication device to:

obtain a first power control parameter list comprising a plurality of elements, where each element in the first power control parameter list comprises one or more values for one or more respective power control parameters; and receive information that indicates an association between an activated Transmission Configuration Indicator, TCI, state and a particular element from among the plurality of elements in the first power control parameter list;

wherein each of the plurality of elements of the one or more power control parameter lists comprises a set of values for two or more power control parameters.

* * * * *